(12) United States Patent
Hayashi

(10) Patent No.: US 11,358,840 B2
(45) Date of Patent: Jun. 14, 2022

(54) CRANE AND INFORMATION-SHARING SYSTEM

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/972,767

(22) PCT Filed: Aug. 1, 2019

(86) PCT No.: PCT/JP2019/030171
§ 371 (c)(1),
(2) Date: Dec. 7, 2020

(87) PCT Pub. No.: WO2020/027256
PCT Pub. Date: Feb. 6, 2020

(65) Prior Publication Data
US 2021/0238017 A1    Aug. 5, 2021

(30) Foreign Application Priority Data

Aug. 2, 2018  (JP) .............................. JP2018-146243

(51) Int. Cl.
*B66C 13/00* (2006.01)
*B66C 13/46* (2006.01)
(Continued)

(52) U.S. Cl.
CPC .............. *B66C 13/46* (2013.01); *B66C 23/42* (2013.01); *G06F 3/1423* (2013.01); *H04N 7/183* (2013.01); *B66C 2700/0371* (2013.01)

(58) Field of Classification Search
CPC .......... B66C 13/04; B66C 13/16; B66C 13/44; B66C 13/46; B66C 15/04; B66C 15/045;
(Continued)

(56) References Cited

U.S. PATENT DOCUMENTS

2003/0214415 A1* 11/2003 Shaw ...................... B66C 15/06
                                                        340/685
2015/0217976 A1*  8/2015 Tanizumi ................ G06F 17/10
                                                        703/2
(Continued)

FOREIGN PATENT DOCUMENTS

JP      2016-175766 A     10/2016
JP      2017-122003 A      7/2017
WO   WO-2015119264 A1  *  8/2015  ........... G05D 1/0038

OTHER PUBLICATIONS

Oct. 15, 2019, International Search Report issued for related PCT application No. PCT/JP2019/030171.
(Continued)

*Primary Examiner* — Emmanuel M Marcelo
(74) *Attorney, Agent, or Firm* — Paratus Law Group, PLLC

(57) ABSTRACT

A crane including a traveling body, a boom supported by the traveling body, and a camera supported by the boom, in which an image is taken by the camera, has control apparatus; a display; and a sensor for acquiring coordinates of the camera. The control apparatus acquires map information in a range of the crane, displays the map information on the display, and displays an image taken by the camera at a coordinate position of the camera on the map information.

4 Claims, 17 Drawing Sheets

(51) Int. Cl.
*B66C 23/42* (2006.01)
*G06F 3/14* (2006.01)
*H04N 7/18* (2006.01)

(58) Field of Classification Search
CPC ....... B66C 15/065; G06F 3/1423; G06F 5/01; H04N 7/183; H04N 7/185
See application file for complete search history.

(56) References Cited

U.S. PATENT DOCUMENTS

| | | | |
|---|---|---|---|
| 2015/0249821 A1* | 9/2015 | Tanizumi | B66C 13/00 |
| | | | 348/46 |
| 2018/0144623 A1* | 5/2018 | Shirakata | H04B 7/0617 |
| 2019/0197324 A1* | 6/2019 | Ji | B60R 1/00 |
| 2019/0270624 A1* | 9/2019 | Sembo | B66C 23/78 |
| 2019/0284027 A1* | 9/2019 | Albrecht | B66C 13/46 |
| 2019/0337771 A1* | 11/2019 | Norton | B66C 23/88 |
| 2020/0126511 A1* | 4/2020 | Gustafsson | G02B 27/0172 |

OTHER PUBLICATIONS

Oct. 15, 2019, International Search Opinion issued for related PCT application No. PCT/JP2019/030171.

* cited by examiner

CRANE AND INFORMATION-SHARING SYSTEM

CROSS REFERENCE TO PRIOR APPLICATION

This application is a National Stage Patent Application of PCT International Patent Application No. PCT/JP2019/030171 (filed on Aug. 1, 2019) under 35 U.S.C. § 371, which claims priority to Japanese Patent Application No. 2018-146243 (filed on Aug. 2, 2018), which are all hereby incorporated by reference in their entirety.

TECHNICAL FIELD

The present invention relates to cranes and information-sharing systems. The present invention particularly relates to a crane and an information-sharing system capable of displaying information of an entire work range including a work range outside an imaging area of a camera, and capable of sharing information input in the entire work range among a plurality of operators.

BACKGROUND ART

Conventionally, cranes are known to be typical working vehicles (see Patent Literature 1). The crane is mainly composed of a vehicle and a crane device. The vehicle is provided with a plurality of wheels and is configured to be travelable. The crane equipment is equipped with wire ropes and hooks besides a boom, and is configured so that a load can be transported freely.

A crane operation support system capable of sharing information among a plurality of operators has been proposed (see Patent Literature 2). In such a crane operation support system, a camera attached to the distal portion of the boom takes an image downward. The operator can input information to be displayed on the image taken by the camera. The image and input information are displayed on a display carried by other operators, and therefore the image of the work site and the input information can be shared. However, if the work range of the crane is wider than the imaging area of the camera, the entire work range is not displayed on the image. Thus, the crane operation support system could not display the information of an entire work range including the work range outside the imaging area of the camera. It also could not enable the information input in the entire work range to be shared among a plurality of operators. Accordingly, there has been a need for a crane and an information-sharing system capable of displaying the information of the entire work range including the work range outside the imaging area of the camera, and capable of sharing information input in the entire work range among a plurality of operators.

CITATION LIST

Patent Literature

PTL 1
Japanese Patent Application Laid-Open No. 2017-122003
PTL 2
Japanese Patent Application Laid-Open No. 2016-175766

SUMMARY OF INVENTION

Technical Problem

A crane and an information-sharing system are provided, each capable of displaying information of an entire work range including a work range outside a imaging area of a camera, and capable of sharing information input in the entire work range among a plurality of operators.

Solution to Problem

A crane of the present invention includes a traveling body, a boom supported by the traveling body, and a camera supported by the boom, in which an image is taken by the camera, the crane comprising:
a control apparatus;
a display; and
a sensor for acquiring coordinates of the camera;
wherein the control apparatus preferably acquires map information in a work range of the crane, displays the map information on the display, and displays an image taken by the camera at a coordinate position of the camera on the map information.

In the crane of the present invention, the control apparatus displays the image on an area on the map information having the same size as an imaging area of the camera,
when the scale of the map information is changed the control apparatus changes a ratio of a distance on the image with respect to a predetermined distance in the imaging area at a change rate of the scale, and
when the ratio of the distance on the image with respect to the predetermined distance in the imaging area is changed, the control apparatus changes a scale of the map information at a change rate of the ratio.

The crane of the present invention further comprises an information input section for inputting information to be displayed on the map information and the image,
when a plurality of the displays are provided, one of the displays displays the map information, the image, and the information input by the information input section, and the other display displays the map information, the image, and the information in the same manner as the one display.

An information-sharing system of the present invention acquires an image taken by a camera from a working vehicle including a working apparatus, the camera supported by the working apparatus, and a sensor for acquiring coordinates of the camera, the information-sharing system comprising:
a control apparatus;
a plurality of displays; and
an information input section for inputting information to be displayed on the displays,
the control apparatus acquires a work range of the working vehicle from the working vehicle, acquires coordinates of the camera from the sensor, displays the map information in the work range on all the displays, and displays the image taken by the camera on an area on the map information having the same size as an imaging area of the camera, the area being a coordinate position of the camera on the map information,
when the scale of the map information in one of the displays is changed, the control apparatus changes a scale of the map information displayed on the other display and a ratio of a distance on the image with respect to a predetermined distance in the imaging area on all the displays at a change rate of the scale,
when a ratio of a distance on the image with respect to a predetermined distance in the imaging area on one of the displays is changed, the control apparatus changes a scale of the map information displayed on all the displays and a ratio of a distance on the image with respect to a predetermined distance in the imaging area on the other display at a change rate of the scale, the control apparatus displays information input into one of the displays by the information Input section on the other display.

Advantageous Effects of Invention

According to the crane of the present invention, it includes a control apparatus, a display, and a sensor for acquiring coordinates of the camera. Then, the control apparatus the control apparatus preferably acquires map information in a work range of the crane, displays the map information on the display, and displays an image taken by the camera at a coordinate position of the camera on the map information. According to such a crane, it is possible to display the information of the entire work range including the work range outside the imaging area of the camera.

According to the crane of the present invention, the control apparatus displays the image on an area on the map information having the same size as an imaging area of the camera, when the scale of the map information is changed, changes a ratio of a distance on the image with respect to a predetermined distance in the imaging area at a change rate of the scale, and when a ratio of a distance on the image with respect to a predetermined distance in the imaging area is changed, changes a scale of the map information at a change rate of the ratio. According to such a crane, even if the scale of the map information and the zoom magnification of the camera are changed, since the area on the map information and the imaging area of the camera are interlocked, the control apparatus can display the information in accordance with the scale and the zoom magnification.

According to the crane of the present invention, it further comprises an information input section for inputting information to be displayed on the map information and the image. When a plurality of displays are provided, one of the displays displays the map information, the image, and the information input by the information input section, and the other display displays the map information, the image, and the information in the same manner as the one display. According to such a crane, each operator inputs information and displays the input information on a display carried by other operator, thereby making it possible to issue an instruction at the discretion of each operator and to communicate with each other.

According to the information sharing-system of the present invention, it comprises: a control apparatus; a plurality of displays; and an information input section for inputting information to be displayed on the displays. The control apparatus displays the image taken by the camera on an area on the map information having the same size as an imaging area of the camera, the area being a coordinate position of the camera on the map information, when the scale of the map information or the distance ratio on the image with respect to the predetermined distance in the imaging area is changed in one display, displays the area of the map information and the imaging area of the camera in conjunction in all the display, and displays the information input into the one display by the information input section in the other display. According to such an information-sharing system, it is possible to display information of the entire work range including the work range outside the imaging area of the camera, and to share information input in the entire work range among a plurality of operators.

DESCRIPTION OF EMBODIMENT

Figure 1:
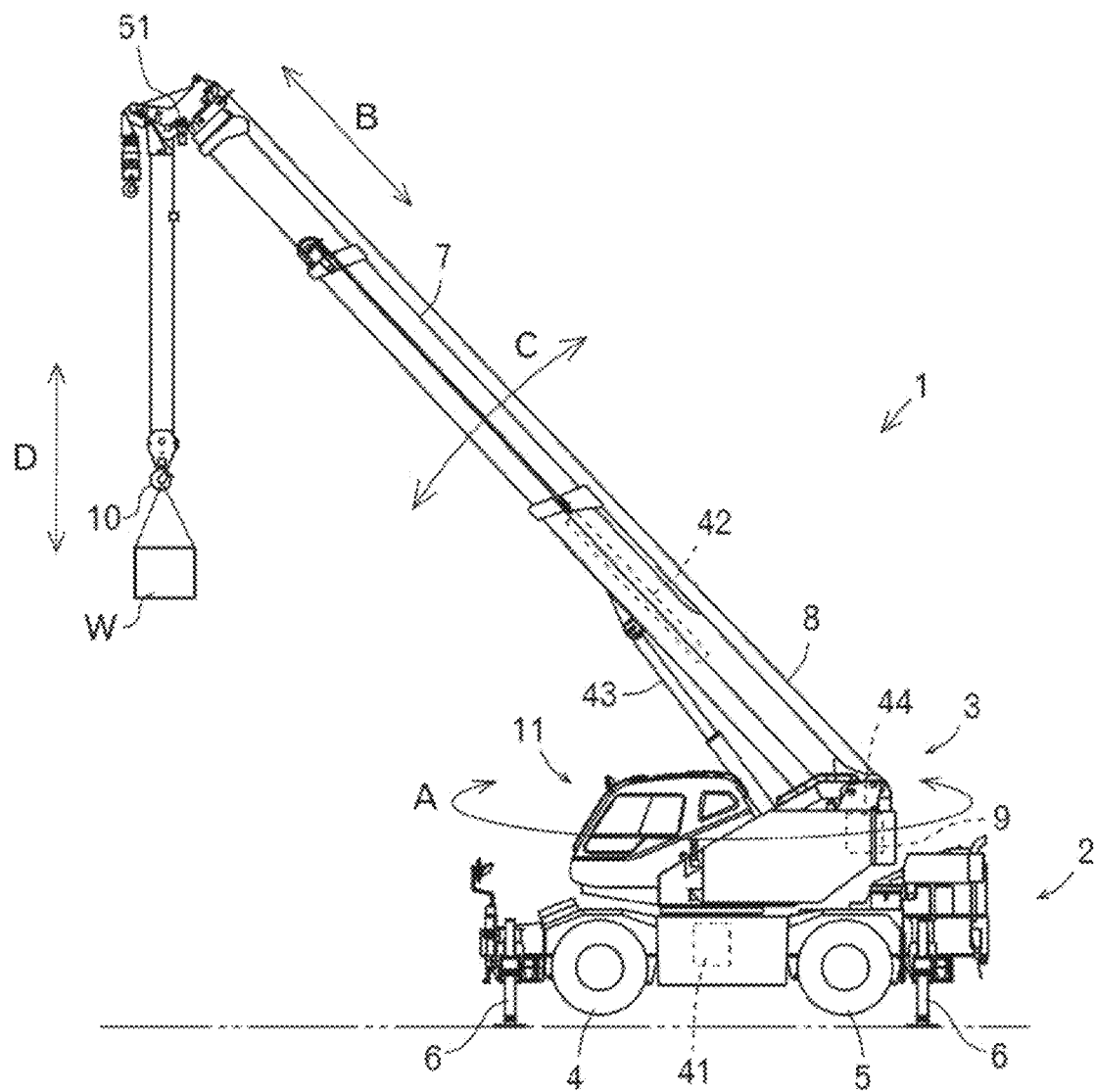
FIG. 1 illustrates a crane.

The technical idea disclosed in the present application can be applied to other cranes as well as the crane 1 described below.

First, crane 1 according to an embodiment will be described with reference to FIG. 1.

Crane 1 is mainly composed of vehicle 2 and crane device 3.

Vehicle 2 is provided with a pair of left and right front wheels 4 and rear wheels 5. Further, vehicle 2 is provided with outrigger 6 to stabilize by grounding when carrying work of load W. It should be noted that crane device 3 supported on vehicle 2 is swivelable by an actuator.

Crane device 3 is provided with boom 7 so as to protrude forward from the rear portion thereof. Boom 7 is swivelable by the actuator for swiveling crane device 3 (see arrow A). Further, the boom 7 is extendible and retractable by the actuator (see arrow B). Further, boom 7 is luffing-free by the actuator (see arrow C). In addition, wire rope 8 is stretched over boom 7. On the proximal end side of boom 7, a winch 9 around which wire rope 8 is wrapped is disposed, on the distal end side of boom 7, hook 10 is suspended by wire rope 8. Winch 9 is integrally configured with the actuator to allow winding and unwinding of wire rope 8. Therefore, hook 10 is movable up and down by the actuator (see arrow D). It should be noted that the crane device 3 is provided with cabin 11 on the side of boom 7. Inside cabin 11, swivel manipulation tool 21, extension and retraction manipulation tool 22, luffing manipulation tool 23, winding manipulation tool 24 are provided. Further, crane-side display terminal 58 is provided.

Figure 2:
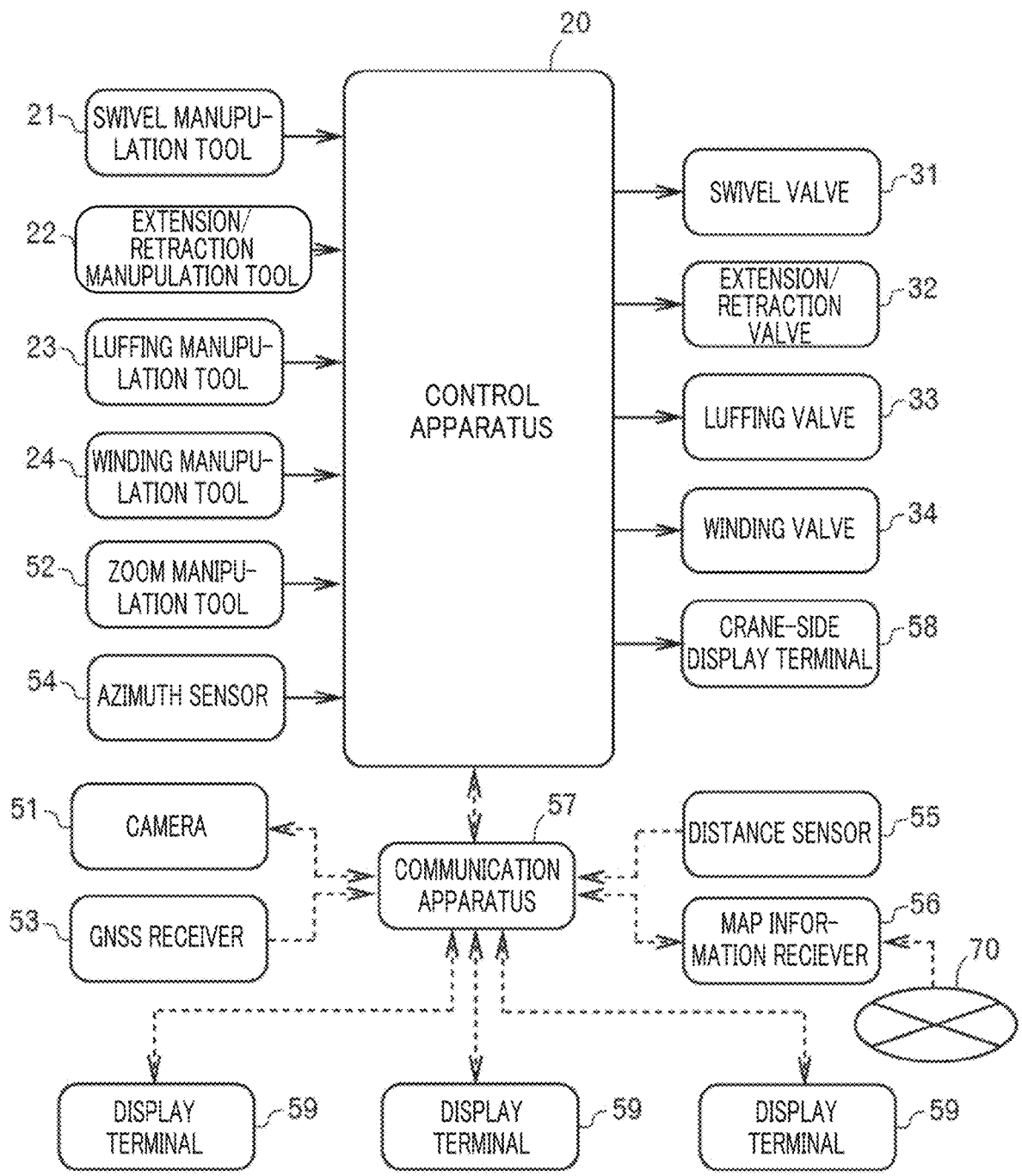
FIG. 2 illustrates a control configuration of a crane.
Figure 3:
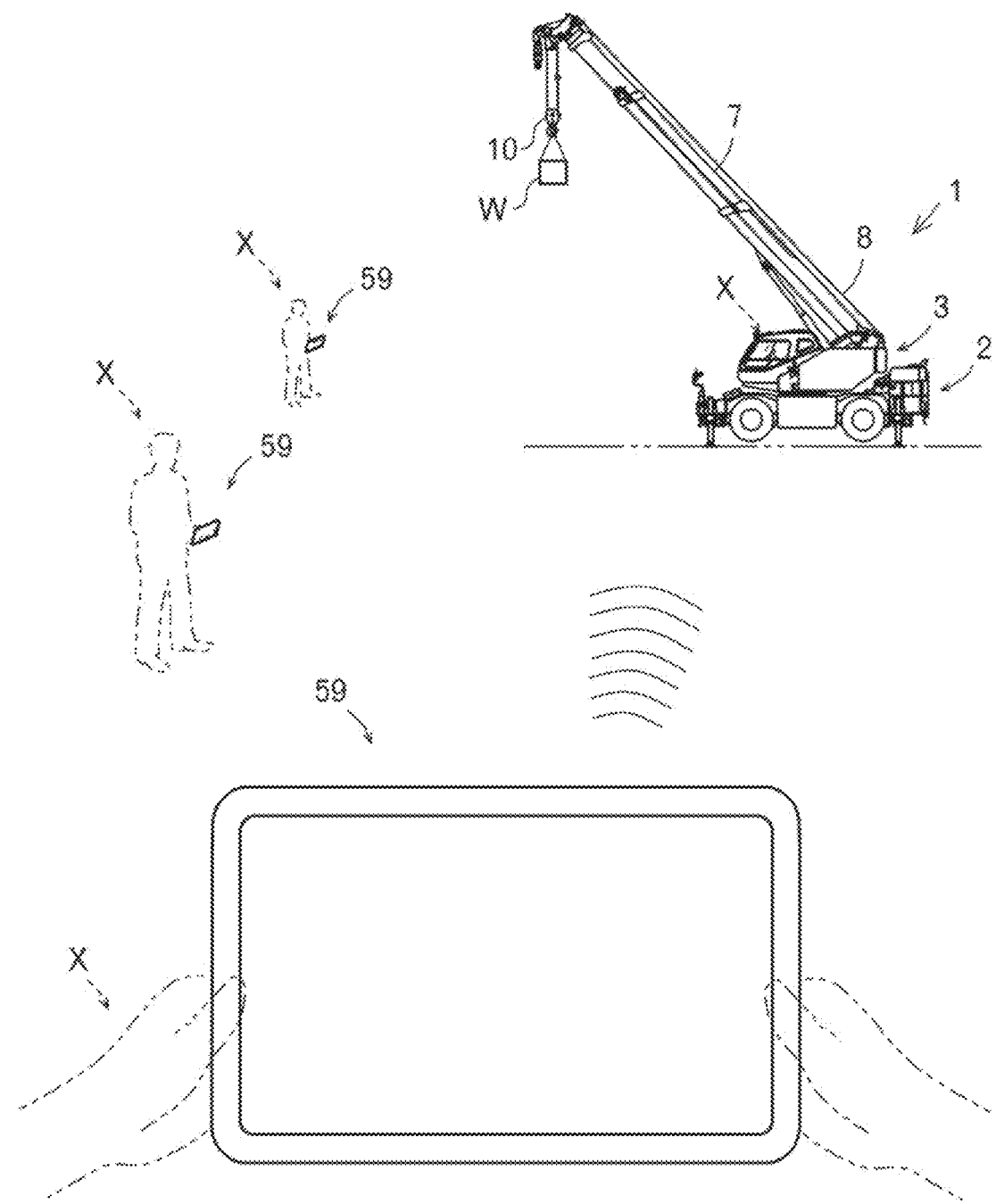
FIG. 3 illustrates a display.

Next, a control configuration of crane 1 will be described with reference to FIGS. 2 and 3. Crane 1 includes control apparatus 20. Hereinafter, an operator who performs an operation in crane 1 and an operator who performs an operation at the work site riding on crane 1 will be described as "operator X".

Various manipulating tools 21 to 24 are connected to control apparatus 20. Further, various valves 31 to 34 are connected to control apparatus 20.

Boom 7 is swivelable by the actuator (see arrow A in FIG. 1). In the present application, such an actuator is defined as swivel hydraulic motor 41. Swivel hydraulic motor 41 is appropriately operated by swivel valve 31 which is a directional control valve. In other words, swivel hydraulic motor 41 is appropriately operated by switching the flow direction of the hydraulic oil with swivel valve 31. Swivel valve 31 is operated based on the operation of swivel manipulation tool 21 by operator X. Further, the swing angle of boom 7 is detected by a sensor which is not shown. Therefore, control apparatus 20 can recognize the swivel angle of boom 7.

Further, boom 7 is extendible and retractable by the actuator (see arrow B in FIG. 1). In the present application, such an actuator is defined as extension/retraction hydraulic cylinder 42. Extension/retraction hydraulic cylinder 42 is appropriately operated by extension/retraction valve 32 which is a directional control valve. In other words, extension/retraction hydraulic cylinder 42 is appropriately operated by switching the flow direction of the hydraulic oil with extension/retraction valve 32. Extension/retraction valve 32 is operated based on the operation of extension/retraction manipulation tool 22 by operator X. Further, the extension/retraction length of boom 7 is detected by a sensor which is not shown. Therefore, control apparatus 20 can recognize the extension/retraction length of boom 7.

Further, boom 7 is luffing-free by the actuator (see arrow C in FIG). In the present application, such an actuator is defined as lutfing hydraulic cylinder 43. Lulling hydraulic cylinder 43 is appropriately operated by luffing valve 33 which is a directional control valve. In other words, lulling hydraulic cylinder 43 is appropriately operated by switching the flow direction of the hydraulic oil with luffing valve 33. Luffing valve 33 is operated based on the operation of luffing manipulation tool 23 by operator X. Further, the luffing angle of boom 7 is detected by a sensor which is not shown. Therefore, control apparatus 20 can recognize the lufting angle of boom 7.

Hook 10 is movable up and down by the actuator (see arrow D in FIG. 1). In the present application, such an actuator is defined as winding hydraulic motor 44. Winding hydraulic motor 44 is appropriately operated by winding valve 34 which is a directional control valve. In other words, winding hydraulic motor 44 is appropriately operated by switching the flow direction of the hydraulic oil with winding valve 34. Winding valve 34 is operated based on the operation of winding manipulation tool 24 by operator X. Further, the slinging length of hook 10 is detected by a sensor which is not shown. Therefore, control apparatus 20 can recognize the slinging length of hook 10.

Further, crane 1 includes camera 51, zoom manipulation tool 52, GNSS receiver 53, azimuth sensor 54, distance sensor 55, map information receiver 56, communication apparatus 57, crane-side display terminal 58, and display terminal 59. In the following embodiments, though control apparatus 20 will be described as obtaining the coordinates of camera 51 using GNSS receiver 53, control apparatus 20 may grasp the position of camera 51 by the deviation of the taken image by camera 51 which is obtained by aligning the position reference point in the image and the map information. Further, control apparatus 20 may grasp the position of camera 51 by grasping the position of communication apparatus 57 by using wireless communication of communication apparatus 57 attached in the vicinity of camera 51.

Camera 51 is an apparatus for taking an image. Camera 51 is attached to the distal end portion of boom 7 to take an image of the work site from above (see FIG. 1). The angle of view of camera 51 is stored in control apparatus 20 as information. Camera 51 is connected to communication apparatus 57.

Zoom manipulation tool 52 is a manipulation tool for operating the zoom magnification of camera 51. Zoom manipulation tool 52 is mounted inside cabin 11. Zoom manipulation tool 52 can operate the optical zoom magnification and the digital zoom magnification of camera 51. The digital zoom is a process of scaling (enlarging or reducing) an image by image processing. Therefore, the digital zoom may be performed using an image taken by camera 51 on control apparatus 20 side rather than on camera 51 side. It should be noted that camera 51 is connected to control apparatus 20. Therefore, control apparatus 20 can recognize the operation signal of zoom manipulation tool 52.

GNSS receiver 53 is a sensor for receiving ranging radio waves from satellites and calculates latitude, longitude, and elevation, which are coordinates. GNSS receiver 53 is attached to the distal end portion of boom 7 in the same manner as camera 51, and is able to calculate the coordinates of camera 51. It should be noted that GNSS receiver 53 is connected to communication apparatus 57.

Azimuth sensor 54 is a sensor for detecting the orientation. Azimuth sensor 54 is attached to vehicle 2. Azimuth sensor 54 detects the directions of the east, west, south, and north. It should be noted that azimuth sensor 54 is connected to control apparatus 20.

Distance sensor 55 is a sensor for detecting the distance. Distance sensor 55 is attached to the distal end portion of boom 7 in the same manner as camera 51. Distance sensor 55 is, for example, a laser distance sensor or a microwave distance sensor. Distance sensor 55 can detect the distance to the ground or the grounded object. It should be noted that distance sensor 55 is connected to communication apparatus 57.

Map information receiver 56 is an apparatus for acquiring map information including the work range of crane 1. The map information receiver 56 is attached to the distal end portion of the boom 7. The map information receiver 56 can acquire the map information including the work range via network 70. The work range (for example, within a radius of 50 m from crane 1) is determined based of the maximum length, the minimum length, the maximum luffing angle and the minimum luffing angle of boom 7, and is stored in control apparatus 20 as information. Instead of acquiring the map information including the work range via the network 70, the map information of the work site may be stored in advance in control apparatus 20. Map information receiver 56 is connected to communication apparatus 57.

Communication apparatus 57 is an apparatus for transmitting and receiving information converted into a radio signal. In communication apparatus 57, in order to reduce the influence on the radio waves due to the grounded objects or the like, at least an antenna is attached to the distal end portion of boom 7. Communication apparatus 57 is connected to display terminal 59 in addition to control apparatus 20. Therefore, communication apparatus 57 can transmit information from control apparatus 20 to display terminal 59. Further, communication apparatus 57 can transmit the work range of crane 1 from control apparatus 20 to map information receiver 56. Further, communication apparatus 57 may transmit an operational signal of zoom manipulation tool 52 from control apparatus 20 to camera 51. In addition, communication apparatus 57 can transmit information from display terminal 59 to control apparatus 20. In addition, communication apparatus 57 may transmit map information including the image taken by camera 51, the coordinates of camera 51, the distance from camera 51 to the ground or the grounded object, and the work range of crane 1 to control apparatus 20.

Crane-side display terminal 58 is a display for displaying various images. Crane-side display terminal 58 is mounted on the front side inside cabin 11 so that operator X can visually recognize various manipulation tools 21 to 24 while operating them. Crane-side display terminal 58 can display the map information and the image taken by camera 51. Crane-side display terminal 58 is a display provided with a touch panel, and is also an information input section for inputting information. Therefore, crane-side display terminal 58 can perform change of the scale of the map information, change of the zoom magnification of camera 51, input of information to be displayed on crane-side display terminal 58, and the like. Instead of inputting information using a touch panel, information may be input using another input apparatus such as a mouse. Further, crane-side display terminal 58 is connected to control apparatus 20. Therefore, control apparatus 20 can provide information to operator X via crane-side display terminal 58. Crane-side display terminal 58 can transmit information input by operator X to control apparatus 20.

Display terminal 59 is a display for displaying various images. Display terminal 59 can display the map information and the image taken by camera 51. Display terminal 59 is a tablet terminal provided with a touch panel, and is also an information input section for inputting information. Therefore, display terminal 59 can perform change of the scale of the map information, change of the zoom magnification of camera 51, input of information to be displayed on crane-side display terminal 58, and the like. Instead of inputting information using the touch panel, information may be input using another input apparatus such as a mouse. Display terminal 59 is connected to control apparatus 20 described above via a radio signal. Therefore, control apparatus 20 can provide information to operator X via display terminal 59. Display terminal 59 can transmit information input by operator X to control apparatus 20.

Figure 4:
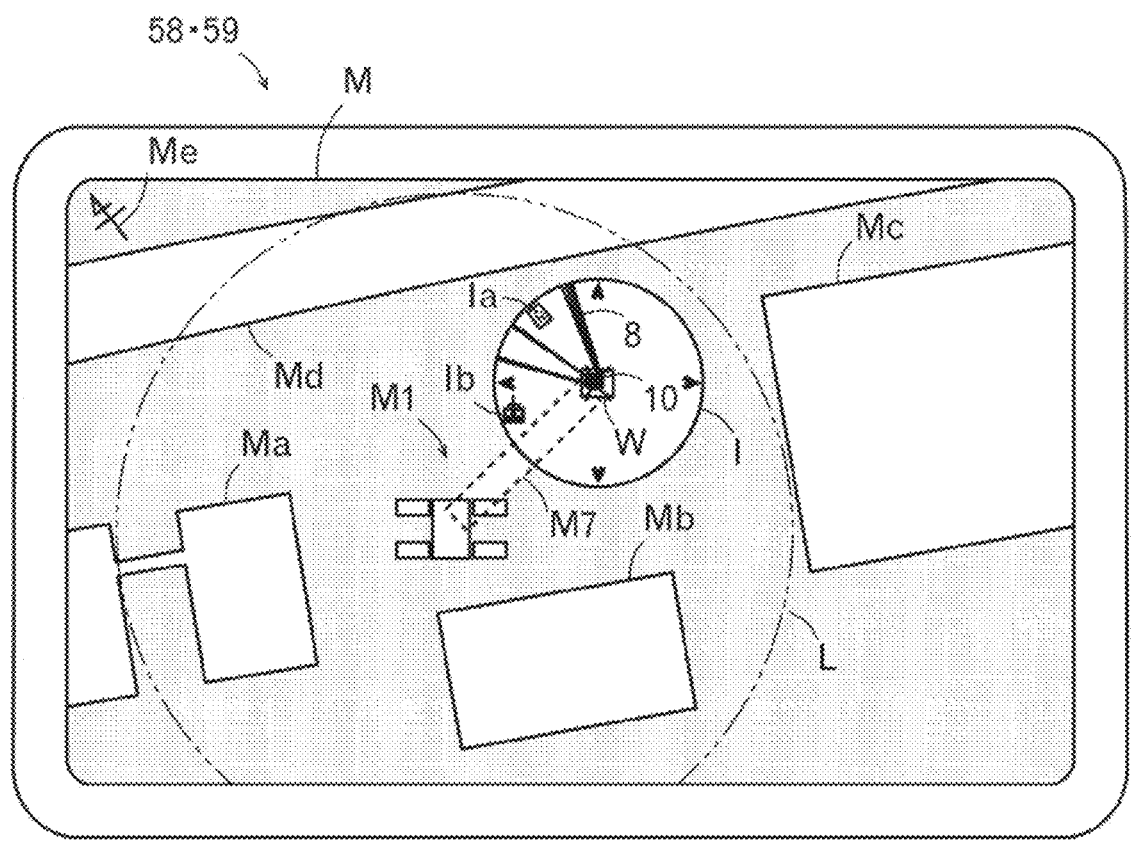
FIG. 4 illustrates an image displayed on map information.

Next, image I displayed on map information M will be described with reference to FIG. 4. Here, the imaging area of camera 51 is the area of the work site in which camera 51 take an image as image I.

First, control apparatus 20 acquires the coordinates of camera 51 by GLASS receiver 53, and acquires the orientation in which vehicle 2 is directed by azimuth sensor 54. Further, the control apparatus 20 calculates the coordinates of the swivel center of boom 7 based on the coordinates of camera 51, and the swivel angle, the extension/retraction length, the luffing angle of boom 7. Then, control apparatus 20 acquires map information M including the work range of crane 1 by map information receiver 56 using the coordinates of the swivel center of boom 7 and the work range of crane 1. Control apparatus 20 causes crane-side display terminal 58 and display terminal. 59 to display the acquired map information M at a predetermined scale which is initially set. For example, in map information M to be displayed, building image Ma indicating a building and a road, building image Mb, building image Mc, and road image Md are displayed. Further, based on the coordinates of the swivel center of boom 7 and the orientation in which vehicle 2 is facing, crane image M1 indicating crane 1 is displayed. Further, based on the work range of crane 1, boundary line L of the work range is displayed.

Further, Control apparatus 20, based on the orientation in which vehicle 2 is facing and the swivel angle of boom 7, calculates the orientation on image I. Further, control apparatus 20 detects the distance to the ground or the grounded object below by distance sensor 55. Control apparatus 20, based on the detected distance and the angle of view of camera 51, calculates the imaging area of camera 51 on map information M. Then, control apparatus 20, while matching the coordinate position of camera 51 and the center of image I on map information M, matches the orientation on map information M and the orientation on image I, and superimposes image I in the area on map information M having the same size as the imaging area of camera 51 to display. At this time, control apparatus 20 displays image I by enlarging or reducing the size of image I, such that the image I is displayed in the area on map information M having the same size as the imaging area of camera 51.

Further, control apparatus 20 displays boom image M7 indicating boom 7 so as to extend from the swivel center of boom 7 to the center of image I. Further, control apparatus 20 displays azimuth image Me indicating the orientation on map information M, and displays azimuth image Ia indicating the north on image I. In addition, a display terminal image Ib indicating the orientation of display terminal 59 with respect to the center of image I may be displayed by attaching a GLASS receiver to display terminal 59 and calculating the coordinate of display terminal 59. When operator X performs a so-called swipe operation for moving the finger while touching the touch panel, control apparatus 20 scrolls map information M and image I to display any position of map information M and image I. For example, when a swipe operation is performed to display a predetermined position determined in the construction guideline, control apparatus 20 displays the predetermined position.

As described above, the present crane 1 includes control apparatus 20, a display (crane-side display terminal 58, display terminal 59), a sensor for obtaining the coordinates of camera 51 (GNSS receiver 53). Then, control apparatus 20 acquires map information M within the work range of crane 1, and while displaying map information M on the display (58, 59), displays image I taken by camera 51 in the coordinate position of camera 51 on map information M. According to such crane 1, it is possible to display the information of the entire work range including the work range outside the imaging area of camera 51.

Next, the relation between map information M and images I when the scale of map information M is changed will be described with reference to FIG. 5A and FIG. 5B. In the following embodiment, increasing the scale of map information M means enlarging map information M. Also, reducing the scale of map information M means reducing map information M. Further, increasing the ratio of the distance on image I with respect to the predetermined distance in the imaging area of camera 51 (hereinafter referred to as "distance ratio") means increasing the zoom magnification of camera 51. In addition, reducing the distance ratio of image I means reducing the zoom magnification of camera 51. Scale S which is the scale of map information M is displayed on map information M, and the scale of map information M is displayed on scale S.

When operator X performs a so-called pinch-out operation in which operator X detaches the two fingers from the touch panel of crane-side display terminal 58 or display terminal 59 with the fingers, control apparatus 20 increases the scale of map information M. Further, when the operator X performs a so-called pinch-in operation in which operator X approaches two fingers while touching the touch panel of the crane-side display terminal 58 or the display terminal 59 with the fingers, control apparatus 20 reduces the scale of map information M.

Figure 5A:
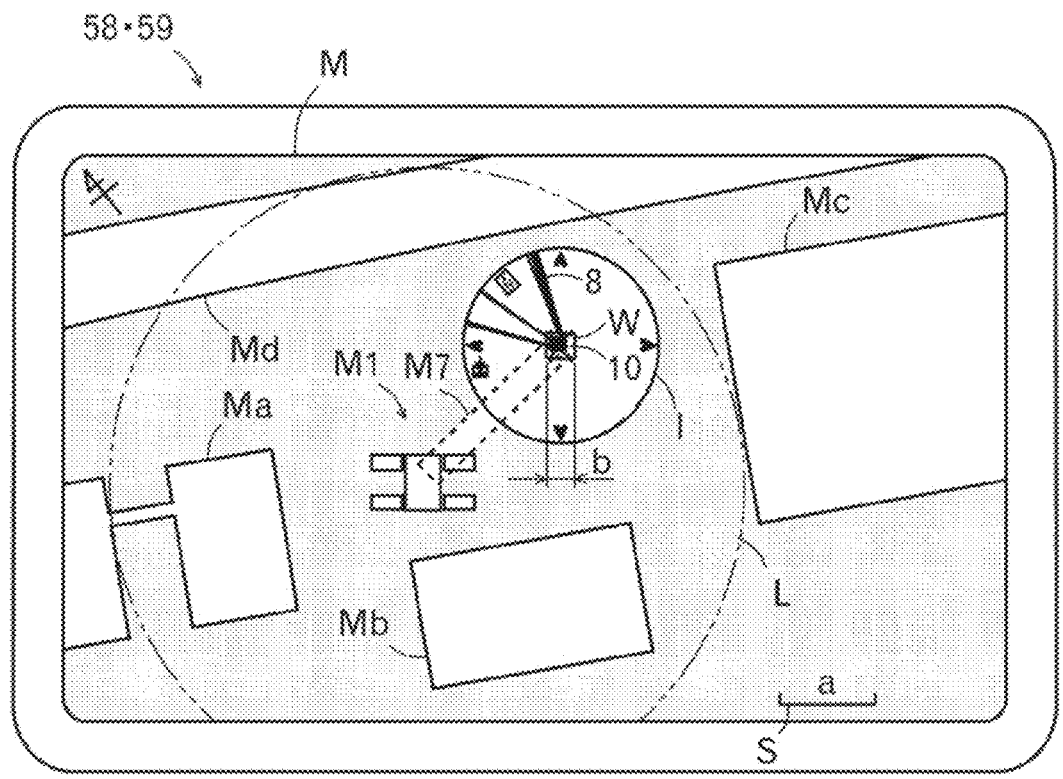
FIG. 5 illustrates the relationship between the map information M and the image I when the scale of the map information M is changed.
Figure 5B:
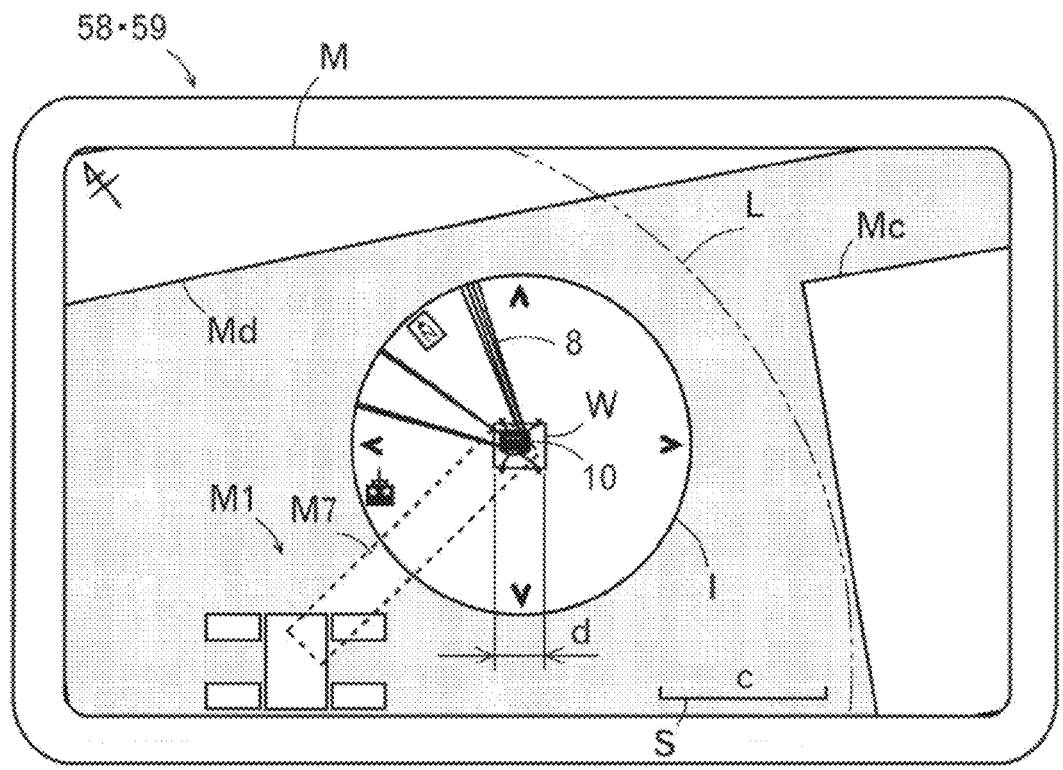

Here, it is assumed that the scale of map information M is a and the width of load Won image I is b prior to the change of the scale of map information M (refer to FIG. 5A). It is assumed that the scale of map information M after the scale of map information M has been changed by the pinch-out operation is c (refer to FIG. 5B). It is assumed that the actual lateral width of load W is e (not shown).

At this time, the change rate of the scale is c/a. Control apparatus 20 changes the zoom magnification of camera 51 at the c/a which is the change rate of scale to change the distance ratio of image I. The horizontal width of load W on image I to be displayed on map information M displayed in scale c shall be Y The distance ratio before the scale of map information M is changed is b/e, and the distance ratio after the scale of map information M is changed is Y/e. The change rate of the distance ratio is Y/e·e/b=Y/b. Since the change rate of the scale c/a is equal to the change rate of the distance ratio Y/b, c/a=Y/b, that is, Y=b·c/a. Therefore, by displaying image I so that Y=b·c/a, control apparatus 20 can display image I in the area on the map information M having the same size as the imaging area of camera 51 even if the scale of map information M is changed.

Next, with reference to FIG. 5A and FIG. 5B, the display of map information M when the zoom magnification of camera 51 is changed will be described.

Operator X changes the zoom magnification of camera 51 by operating zoom manipulation tool 52 of crane 1. At this time, control apparatus 20, while changing the distance ratio of image I at the change rate of the zoom magnification, changes the scale of map information M. That is, control apparatus 20 changes the scale of map information M at the change rate of the distance ratio.

Here, it is assumed that the scale of map information M is a and the width of load. W on image I is b before the zoom magnification of camera 51 is changed (see FIG. 5A). Assume that the width of the load W on image I is d after the zoom magnification of camera 51 is changed by the operation of the zoom manipulation tool 52 (see FIG. 5B). It is assumed that the actual lateral width of load W is e (not shown).

The distance ratio before the scale of map information M is changed is b/e, and the distance ratio after the scale of map information M is changed is d/e. At this time, the change rate of the distance ratio is d/e·e/b=d/b. Control apparatus 20 changes the scale of map information M at the change rate b of the distance ratio. The scale of map information M to be displayed together with image I displayed in the distance ratio d/b shall be set to Z. The change rate of the scale is Z/a. Since the change rate Z/a of the scale is equal to the change rate die of the distance ratio, Z/a=d/b, that is, Z=a·d/b. Therefore, by displaying map information M so that Z=a d/b, control apparatus 20, even if the zoom magnification of camera 51 is changed, can display image I in the area on map information M having the same size as the imaging area of camera 51.

Figure 6A:
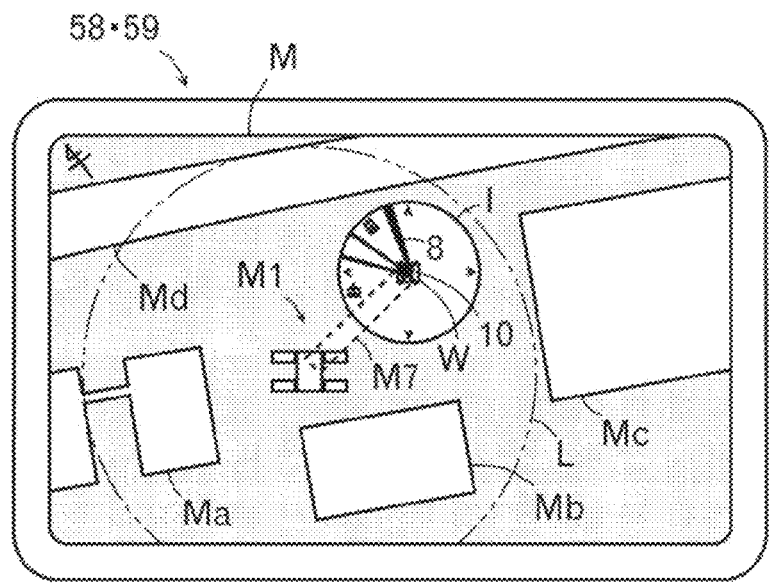
FIG. 6 illustrates a display mode of map information and an image by a digital zoom of a camera.

Next, with reference to FIG. 6A FIG. 6B, and FIG. 6C, as a first embodiment, the display mode of map information M and image I by the digital zoom of camera 51 will be described. First, a case will be described in which the operation of changing the zoom magnification of camera 51 is performed.

Figure 6B:
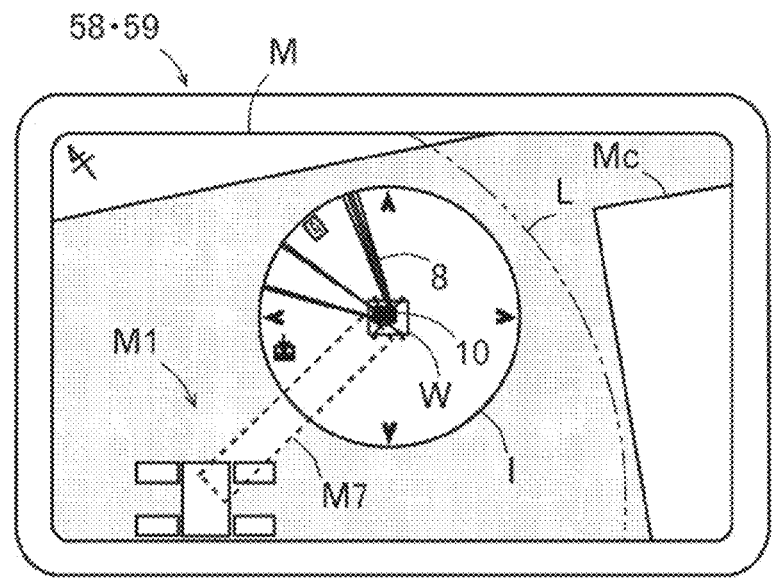
Figure 6C:
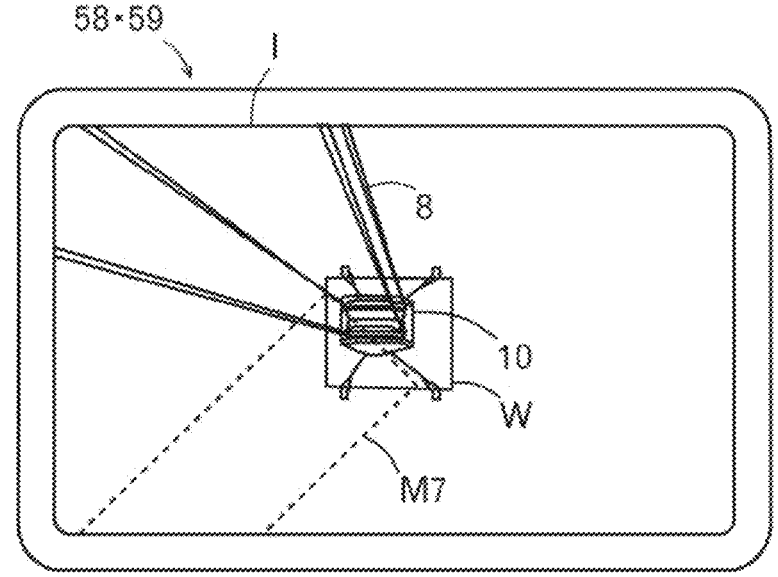

When the operation of increasing the zoom magnification of camera 51 is performed while image I is displayed on map information M (see FIG. 6A), control apparatus 20 increases the distance ratio of image I by the digital zoom of camera 51, and increases the scale of map information M at the change rate of the distance ratio (see FIG. 6B). At this time, control apparatus 20 increases the size of image I in accordance with the distance ratio. When the operation of increasing the zooming ratio of cameras 51 is performed until a state in which image I is displayed on the entire display screen, control apparatus 20 displays only image I on crane-side display terminal 58 or display terminal 59 (refer to FIG. 6C). As a result, operator X can acquire the state of load W and the detailed information about its surroundings by image I. It should be noted that the center portion of image I may be cropped and displayed by image processing so that the size of image becomes constant.

When the operation of reducing the zoom magnification of camera 51 is performed while displaying only image I (see FIG. 6C), control apparatus 20, while reducing the distance ratio of image I by the digital zoom of camera 51, reduces the scale of map information M at the change rate of the distance ratio (see FIG. 6B and FIG. 6A). At this time, control apparatus 20 reduces the size of image I in accordance with the distance ratio. As a result, control apparatus 20 displays map information M and image I on crane-side display terminal 58 or display terminal 59. By this, operator X can acquire the state of load W and the information of the grounded objects around it by image I and map information M.

Next, the case where operations for changing the scale of map information M are performed will be described with reference to FIG. 6A, FIG. 6B, and FIG. 6C.

When the pinch-out operation is performed while image I is displayed on map information M (refer to FIG. 6A), control apparatus 20 increases the scale of map information M and increases the distance ratio of image I by the digital zoom of camera 51 at the change rate of the scale (refer to FIG. 6B). When the pinch-out operation is performed until image I is displayed on the entire display screen, control apparatus 20 displays only image I on the crane-side display terminal 58 or the display terminal 59 (refer to FIG. 6C).

When the pinch-in operation is performed while only image I is displayed (refer to FIG. 6C), control apparatus 20 reduces the scale of map information M and reduces the distance ratio of image I by the digital zoom of camera 51 at the change rate of the scale (refer to FIG. 6B and FIG. 6A). As a result, control apparatus 20 displays map information M and image I on crane-side display terminal 58 or display terminal 59.

Next, with reference to FIG. 7A and FIG. 7B, as a second embodiment, the display mode of map information M and image I by the optical zoom of camera 51 will be described. First, the case where the operation of changing the optical zoom magnification of camera 51 is performed will be described.

Figure 7A:
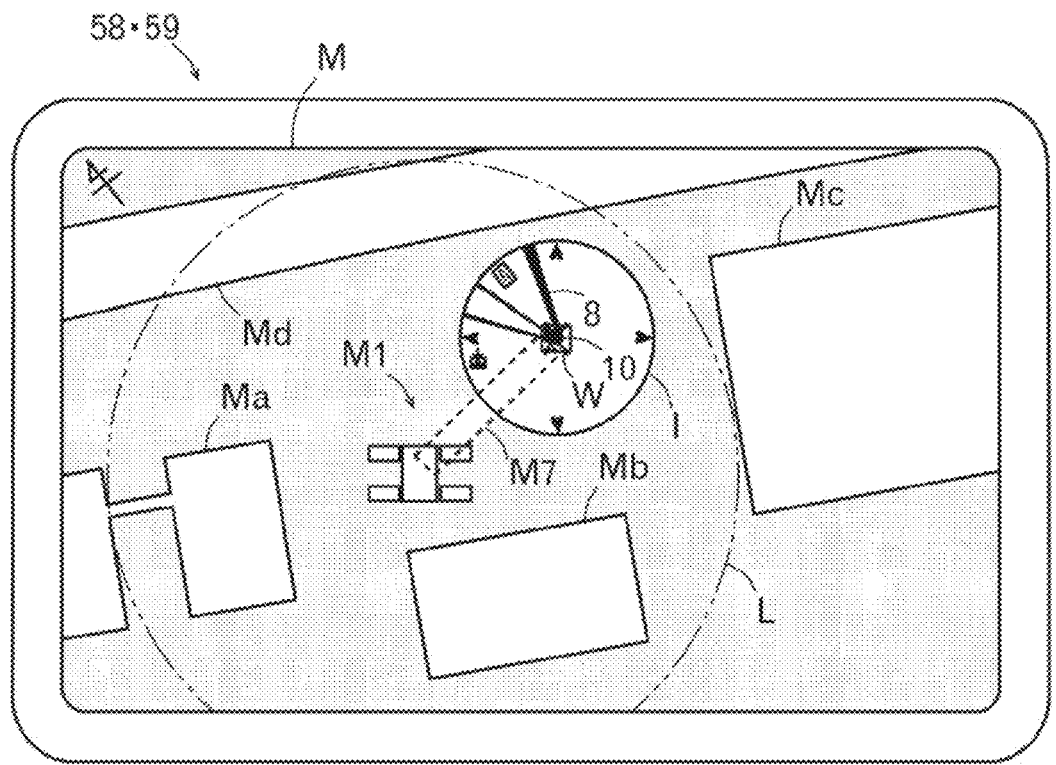
FIG. 7 illustrates a display mode of map information and an image by an optical zoom of a camera.
Figure 7B:
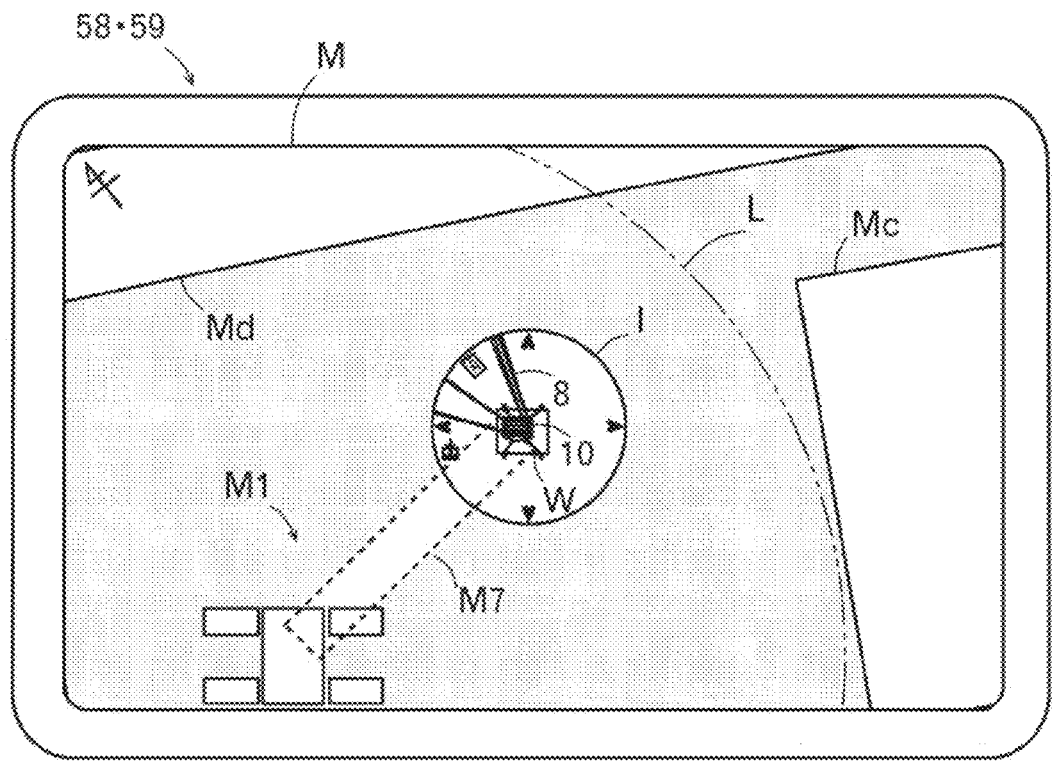

When the operation of increasing the optical zoom magnification of camera 51 is performed while displaying image I on map information M (refer to FIG. 7A), control apparatus 20 increases the distance ratio of image I by the optical zoom of camera 51, and increases the scale of map information M at the change rate of the distance ratio (refer to FIG. 7B). Since the scale of map information M becomes larger and the imaging range of image I becomes smaller at the same change rate as the change rate of the scale, the size of image I does not change. By this, operator X can clearly acquire the state of load W and the detailed information about its surroundings by image I.

If the operation of reducing the optical zoom magnification of camera 51 while displaying image I on map information M is performed (refer to FIG. 7B), control apparatus 20, together with reducing the distance ratio of the image I by the optical zoom, the image I to reduce the scale of the map information M at the change rate of the distance ratio (refer to FIG. 7A). At this time, since the scale of map information M becomes smaller and the imaging range of image I becomes larger at the same change rate as the change rate of the scale, the size of image I does not change. By this, operator X can acquire the state of load W and the information of the grounded object around it by image I and map information M.

Next, the case where operations for changing the scale of map information M is performed will be described with reference to FIGS. 7A and 7B.

When the pinch-out operation is performed while displaying image I on map information M (refer to FIG. 7A), control unit 20 increases the scale of map information M, and increases the distance ratio of image I by the optical zoom of camera 51 at the change rate of the scale (refer to FIG. 7B). At this time, since the scale of map information M becomes larger and the imaging range of image I becomes smaller at the same change rate as the change rate of the scale, the size of image I does not change.

When the pinch-in operation is performed while image I is displayed on map information M (refer to FIG. 7B), control apparatus 20 reduces the scale of map information M and reduces the distance ratio of image I by the optical zoom of camera 51 at the change rate of the scale (refer to FIG. 7A). At this time, since the scale of map information M becomes smaller, and the imaging range of image I becomes larger at the same change rate as the change rate of the scale, the size of image I does not change.

Next, with reference to FIG. 8A and FIG. 8B, as a third embodiment, the display mode of map information M and image I by both the optical zoom and the digital zoom of camera 51 will be described. First, the case where the operation of changing the zoom magnification of camera 51 is performed will be described.

Figure 8A:
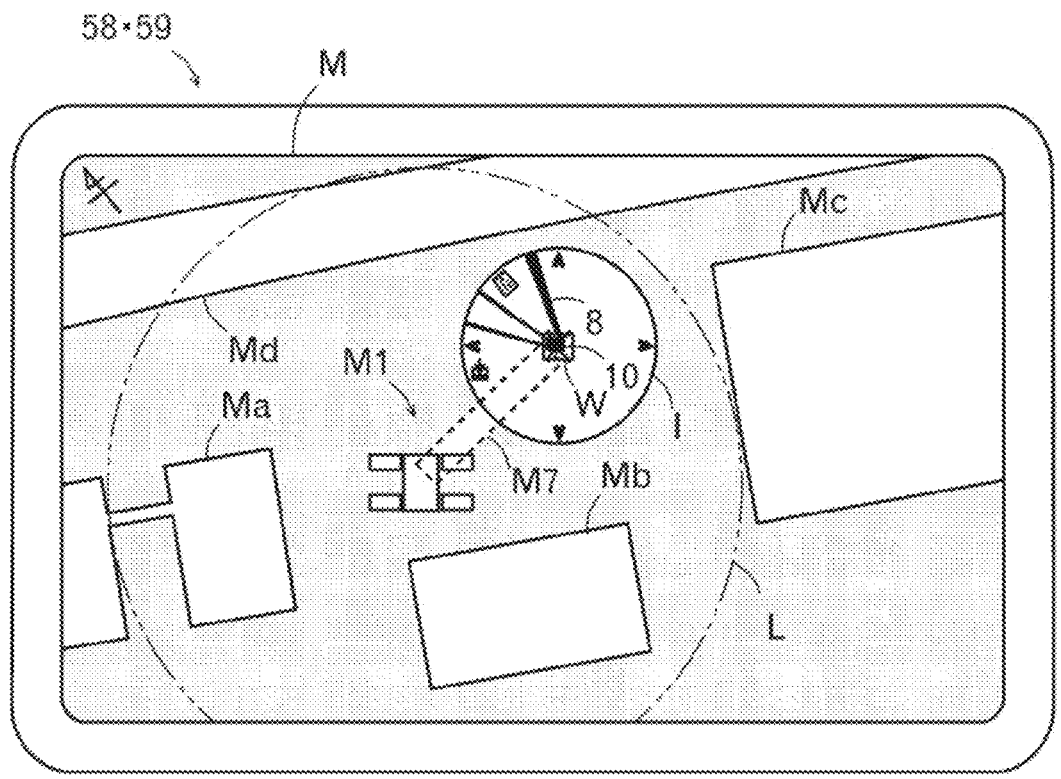
FIG. 8 illustrates a display mode of map information and an image by both an optical zoom and a digital zoom of a camera.
Figure 8B:
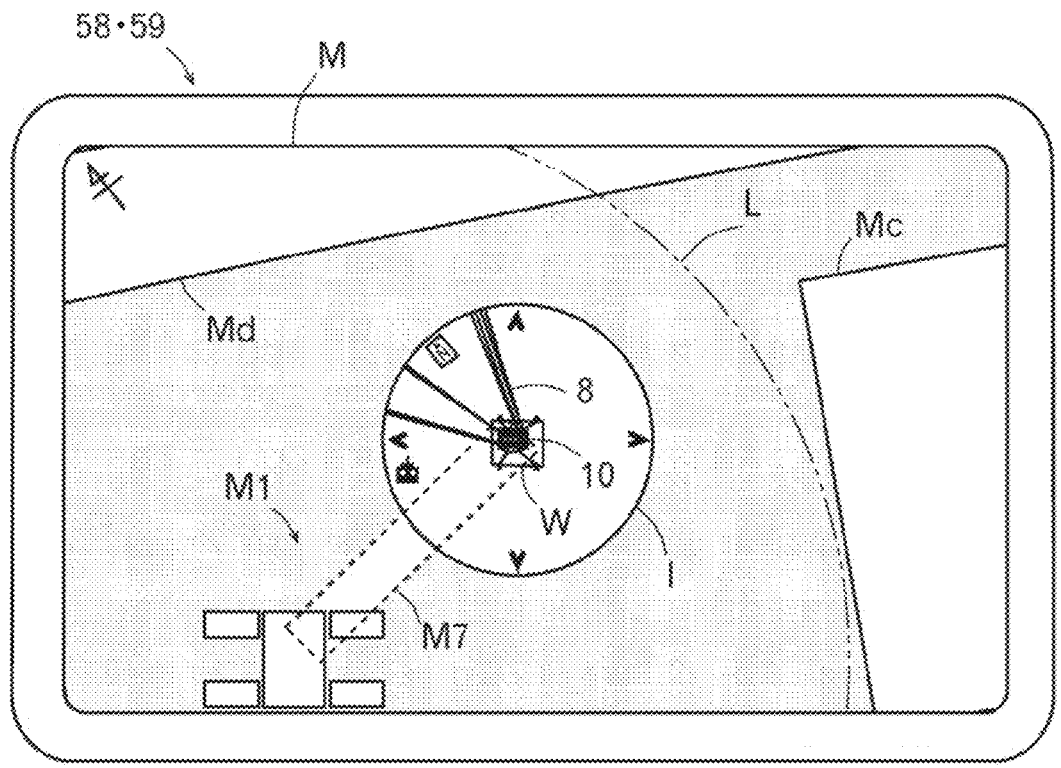

When the operation of increasing the zoom magnification of camera 51 is performed while displaying image I on map information M (refer to FIG. 8A), control apparatus 20 increases the distance ratio of image I at a magnification obtained by multiplying the digital zoom magnification of camera 51 by the optical zoom magnification of camera 51, and increases the scale of map information M at the change rate of the distance ratio (refer to FIG. 8B). Specifically, controller 20 increases the distance ratio of image I by the digital zoom of camera 51, and increases the scale of map information M at the change rate of the distance ratio. At this time, control apparatus 20 increases the size of image I in accordance with the distance ratio. At the same time, control apparatus 20 increases the distance ratio of image I by the optical zoom of camera 51, and increases the scale of the map information M at the change rate of the distance ratio. Since the scale of map information M becomes larger and the imaging range of image I becomes smaller at the same change rate as the change rate of the scale, the size of image I does not change. Therefore, image I having the increased size at the change rate of the distance ratio by the digital zoom of camera 51 is displayed. By this, operator X can clearly acquire the state of load W and the detailed information on wide range of surroundings by image I. It should be noted that the ratio of the digital zoom magnification and the optical zoom magnification of camera 51 may be any ratio.

When the operation of reducing the zoom magnification of camera 51 is performed while displaying image I on map information M (refer to FIG. 8B), control apparatus 20 reduces the distance ratio of image I at the magnification obtained by multiplying the digital zoom magnification of camera 51 by the optical zoom magnification of camera 51, and reduces the scale of map information M at the change ratio of the distance ratio (refer to FIG. 8A). Specifically, control apparatus 20, while reducing the distance ratio of image I by the digital zoom of camera 51, reduces the scale of map information M at the change rate of the distance ratio. At this time, control apparatus 20 reduces the size of image I in accordance with the distance ratio. At the same time, control apparatus 20, while reducing the distance ratio of image I by the optical zoom of camera 51, reduces the scale of map information M at the change rate of the distance ratio. Since the scale of map information M becomes smaller and the imaging range of image I becomes larger at the same change rate as the change rate of the scale, the size of image I does not change. Therefore, image I having the reduced size at the change rate of the distance ratio by the digital zoom of camera 51 is displayed. By this, operator X can acquire the state of load W and the information on the grounded objects around it by image I and map information M.

Next, the case where operations for changing the scale of map information M are performed will be described with reference to FIG. 8A and FIG. 8B.

When the pinch-out operation is performed while image I is displayed on map information M (refer to FIG. 8A), control apparatus 20 increases the scale of map information M and increases the distance ratio of image I by the digital zoom and the optical zoom of camera 51 at the change rate of the scale (refer to FIG. 8B). At this time, by control apparatus 20, the change rate of the magnification and the scale obtained by multiplying the digital zoom magnification and the optical zoom magnification of camera 51 are controlled to be equal.

When the pinch-in operation is performed while image I is displayed on map information M (refer to FIG. 8B), control apparatus 20 reduces the scale of map information M and reduces the distance ratio of image I by the digital zoom and the optical zoom of camera 51 at the change rate of the scale (refer to FIG. 8A). At this time, by the control apparatus 20, the change rate of the magnification and the scale obtained by multiplying the digital zoom magnification and the optical zoom magnification of camera 51 are controlled to be equal.

Next, with reference to FIG. 9A, FIG. 9B, FIG. 9C, FIG. 10A, FIG. 10B, and FIG. 10C, as a fourth embodiment, the display mode of map information M and image I for switching the optical zoom and the digital zoom of camera 51 will be described. First, the case where the operation of changing the zoom magnification of camera 51 is performed will be described.

Figure 9A:
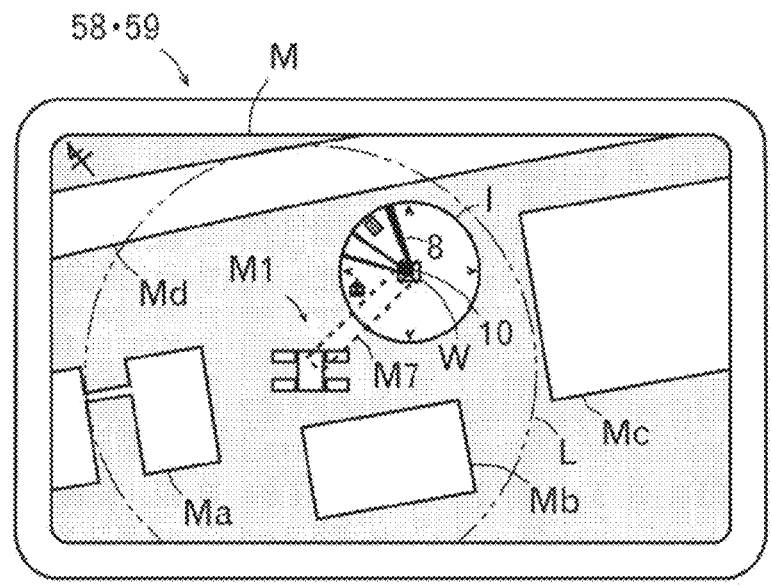
FIG. 9 illustrates a display mode of map information and an image for switching an optical zoom and a digital zoom of a camera.
Figure 9B:
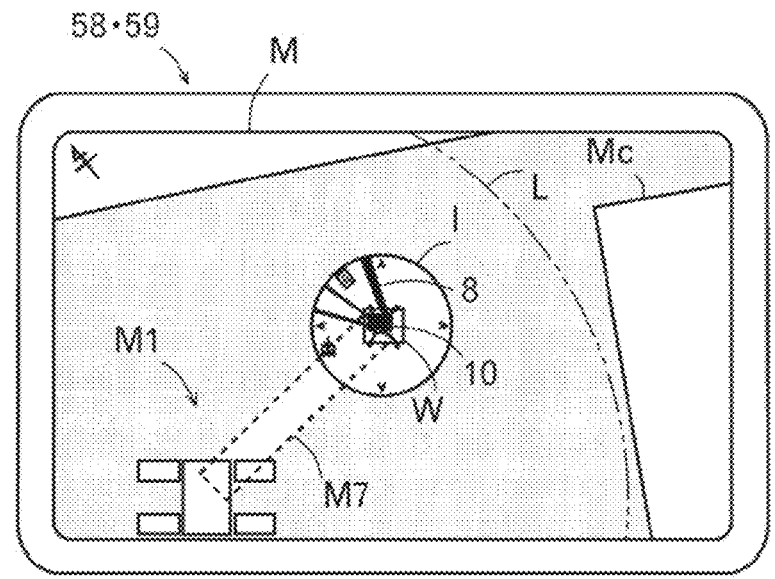
Figure 9C:
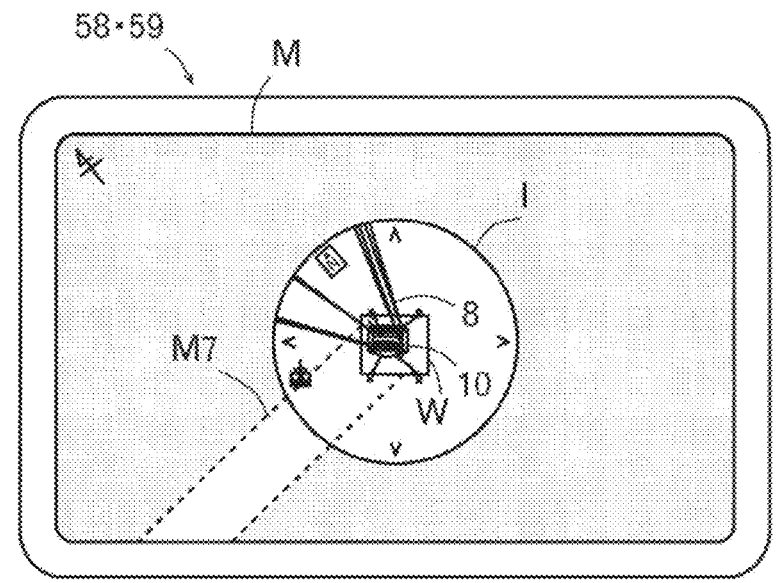

When the operation of increasing the zoom magnification of camera 51 is performed while displaying image I on map information M (refer to FIG. 9A), control apparatus 20 increases the distance ratio of image I by the optical zoom of camera 51, and increases the scale of map information M at the change rate of the distance ratio (refer to FIG. 9B). Since the scale of map information M becomes larger and the imaging range of image I becomes smaller at the same change rate as the change rate of the scale, the size of image I does not change. In the case where the operation of increasing the zoom magnification of camera 51 is performed when the optical zoom magnification of camera 51 is the maximum magnification, control apparatus 20 increases the distance ratio of image I by the digital zoom of camera. 51, and increases the scale of map information M at the change rate of the distance ratio (refer to FIG. 9C). At this time, control apparatus 20 increases the size of image I in accordance with the distance ratio. By this, operator X can acquire the state of load W and the detailed information about its surroundings by image I even when the optical zoom of camera 51 is at the maximum magnification.

Figure 10A:
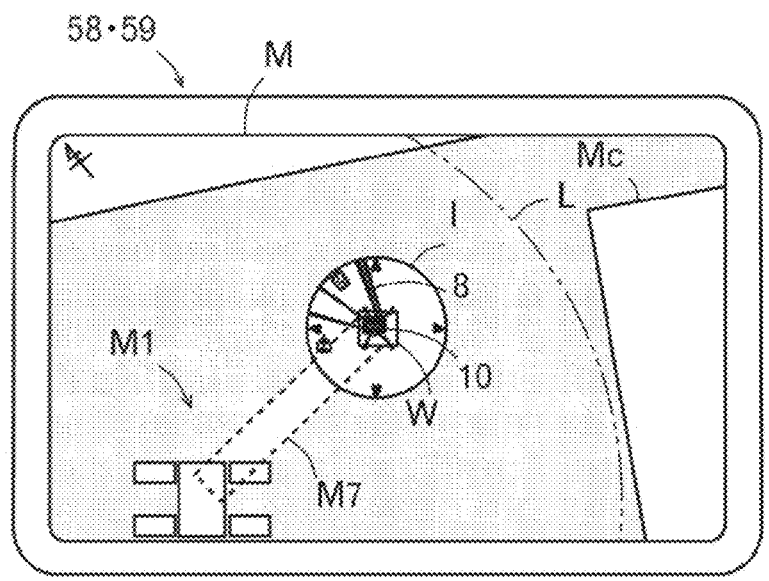
FIG. 10 illustrates a display mode of map information and an image for switching an optical zoom and a digital zoom of a camera.
Figure 10B:
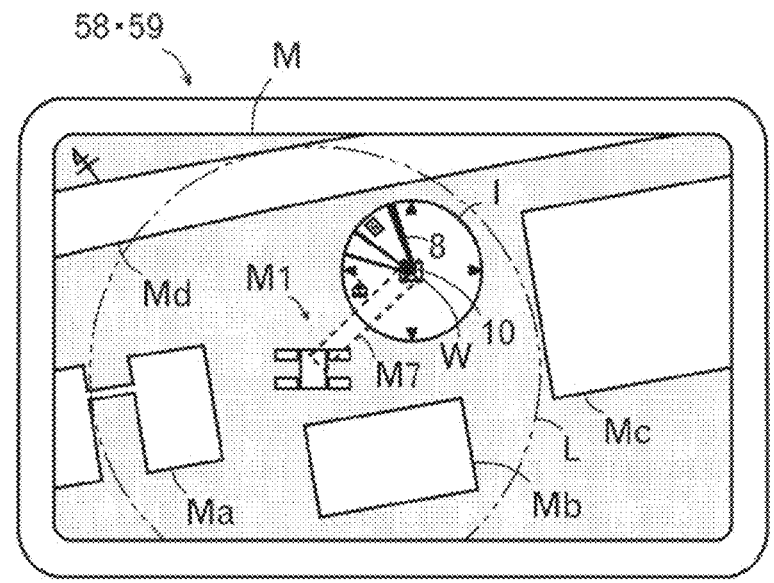
Figure 10C:
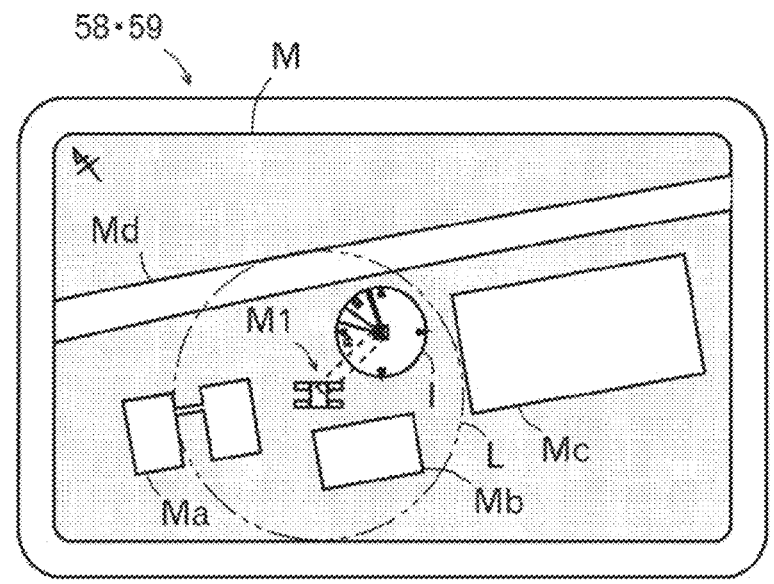

When the operation of reducing the zoom magnification of camera 51 is performed while displaying image I on map information M (refer to FIG. 10A), control apparatus 20 reduces the distance ratio of image I by the optical zoom of camera 51 together, and reduces the scale of map information M at a change rate of the distance ratio of image I (refer to FIG. 10B). Then, in the case where the operation of reducing the zoom magnification of camera 51 is performed when the optical zoom magnification of camera 51 is the minimum magnification, control apparatus 20 reduces the distance ratio of image I by the digital zoom of camera 51, and reduces the scale of map information M at a change rate of the distance ratio (refer to FIG. 10C). At this time, control apparatus 20 reduces the size of image I in accordance with the distance ratio. Bu this, operator X can acquire the state of load W and the information of the grounded objects on a wide range of its surroundings by image I and map information M even when the optical zoom of camera. 51 is at the minimum magnification.

Next, with reference to FIG. 9A, FIG. 9B. FIG. 9C, FIG. 10A, FIG. 10B, and FIG. 10C, the case where operations for changing the scale of map information M is performed will be described.

When the pinch-out operation is performed while displaying image I on map information M (refer to FIG. 9A), control unit 20 increases the scale of map information M, and increases the distance ratio of image I by the optical zoom of camera 51 at the change rate of the scale (refer to FIG. 9B). At this time, since the scale of map information M becomes larger and the imaging range of image I becomes smaller at the same change rate as the change rate of the scale, the size of image I does not change. In the case where the pinch-out operation is performed when the optical zoom magnification of camera 51 is the maximum magnification, control apparatus 20 increases the scale of map information M, and increases the distance ratio of image I by the digital zoom of camera 51 at a change rate of the scale (refer to FIG. 9C).

When the pinch-in operation is performed while image I is displayed on map information M (refer to FIG. 10A), control apparatus 20 reduces the scale of map information M, and reduces the distance ratio of image I by the optical zoom of camera 51 at the change rate of the scale (refer to FIG. 10B). At this time, since the scale of map information M becomes smaller and the imaging range of image I becomes larger at the same change rate as the change rate of the scale, the size of image I does not change, in the case where the pinch-in operation is performed when the optical zoom magnification of camera 51 is the minimum magnification, control apparatus 20 decreases the distance ratio of image I by the digital zoom of camera 51 at the change rate of the scale (refer to FIG. 10C).

As described above, in the present crane 1, control apparatus 20 displays image in an area on map information M having the same size as the imaging area of camera 51, changes the ratio of the distance (distance ratio) on image I with respect to a predetermined distance in the imaging area at the change rate of the scale when changing the scale of map information M. and changes the scale of map information M at the change rate of the ratio when changing the ratio of the distance (distance ratio) on image I with respect to a predetermined distance in the imaging area. According to such crane 1, even if the scale of map information M and the zoom magnification of camera 51 are changed, since the area on map information M and the imaging area of camera 51 are interlocked, the information corresponding to the scale and the zoom magnification can be displayed.

Figure 11A:
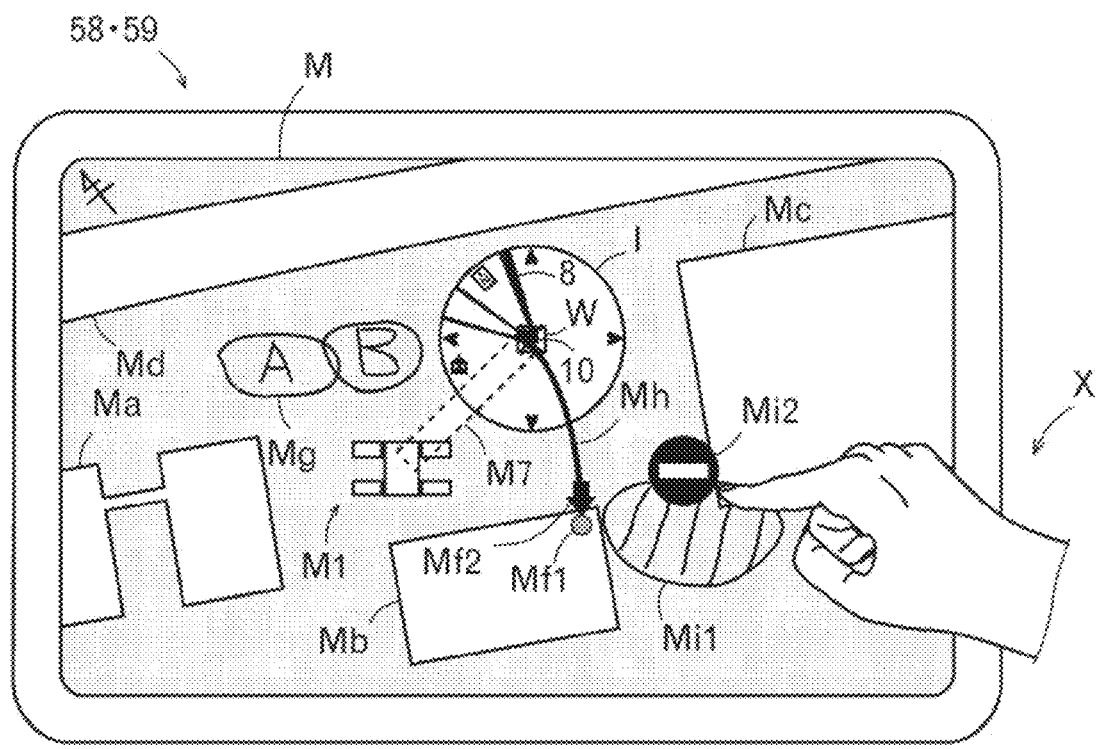
FIG. 11 illustrates an input and sharing of information displayed on map information and on an image.
Figure 11B:
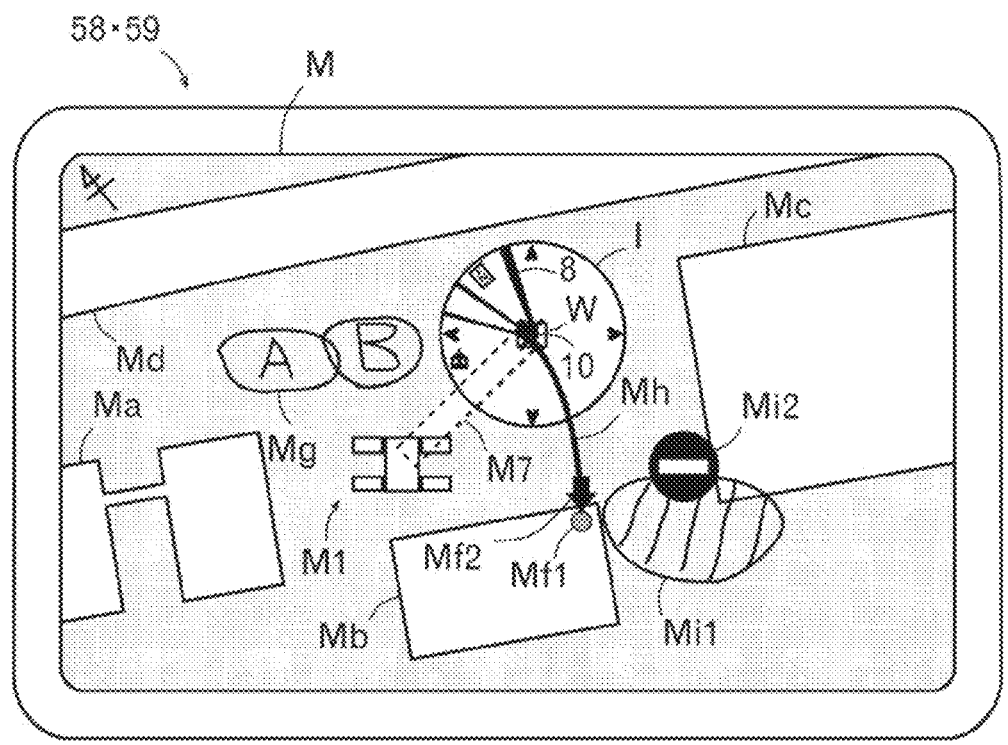

Next, with reference to FIG. 11A and FIG. 11B, as a fifth embodiment, a display mode in which input information is shared will be described.

Control apparatus 20 displays image I in an area on map information M having the same size as the imaging area of camera 51. Then, in one of crane-side display terminal 58 and display terminal 59, operator X inputs information to be displayed on map information M and image I. The input of the information to be displayed is performed by handwriting input or arrangement of marks on the touch panel. For example, installation position image Mf1 and installation position image Mf2 which are the marks indicating the installation positions of load W are displayed on map information M (refer to FIG. 11A). A handwritten slinging position image Mg indicating a slinging position is displayed on map information M. Further, on map information M, a handwritten carriage route image Mh indicating the carriage route of load W is displayed. In addition, a handwritten entry prohibition instruction image Mi1 indicating an entry prohibition instruction and a mark entry prohibition instruction image Mi2 are displayed on map information M. Control apparatus 20 automatically recognizes the area of entry prohibition instruction image Mi1 overlapping with entry prohibition instruction image Mi2 as the entry prohibition area, and performs control so that load W and boom 7 do not enter the entry prohibition area.

Crane-side display terminal 58 or display terminal 59 to which the information has been input transmits the input information to control apparatus 20. Then, control apparatus 20 transmits and displays the input information to crane-side display terminal 58 and display terminal 59 to which no information has been input (refer to FIG. 11B). For example, a scaffolder or a site supervisor who grasps the installation position of load W can share the information of the installation position of load W with an operator who performs an operation of carrying load W in cabin 11 by inputting the installation position of load W to display terminal 59. Since the installation position of load W is displayed on map information M and image I, it is easier to understand than an instruction by voice using radio, and a difference in recognition of the installation position of load W is less likely to occur between the scaffolder or the site supervisor and the operator. In addition, since the situation of the work site can be shared between the scaffolder or the site supervisor and the operator, the safety and the work efficiency can be improved. Furthermore, since the direction on map information M can be used as the operation direction of load W in the operation method using the carriage direction of load W as a reference, control apparatus 20 easily cooperates with the operation method using the carriage direction of load W as a reference.

Figure 12A:
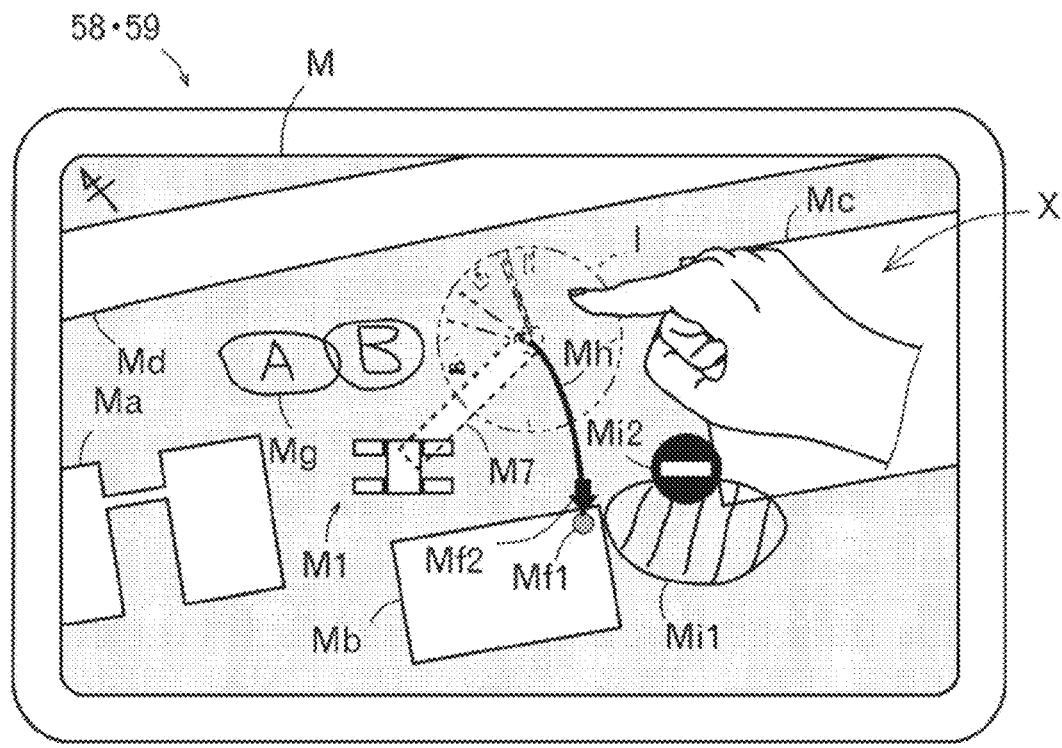
FIG. 12 illustrates hiding an image and sharing it.
Figure 12B:
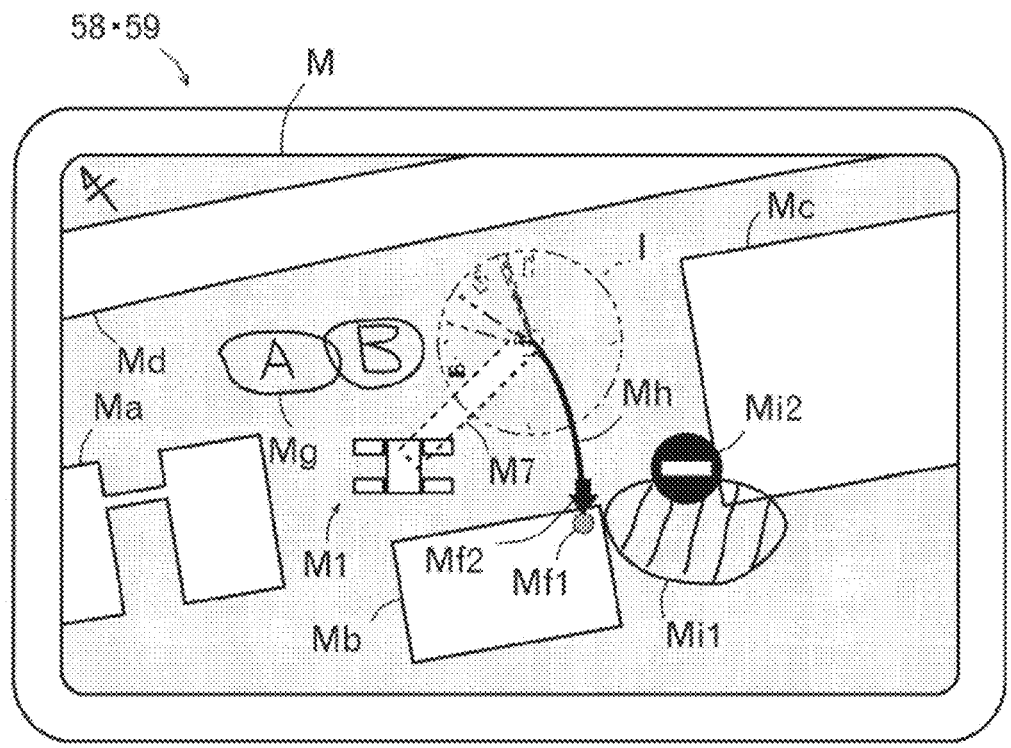

Next, a mode of hiding image I and sharing it will be described with reference to FIG. 12A and FIG. 12B.

Control apparatus 20 displays image I in an area on map information M having the same size as the imaging area of camera 51. Then, in one of crane-side display terminal 58 and display terminal 59, operator X performs an operation of hiding image I. For example, when operator X touches image I, image I is hidden (refer to FIG. 12A).

Crane-side display terminal 58 and display terminal 59 which have been operated transmit to control apparatus 20 that the operation of hiding image I has been performed. Then, the control apparatus 20 transmits an instruction to hide the image I to crane-side display terminal 58 and display terminal 59 which have not been operated, and hides image I (refer to FIG. 12B). Therefore, when map information M is difficult to see for operator X due to the display of image I, only map information M can be displayed by hiding image I. It should be noted that only crane-side display terminal 58 and display terminal 59 which have been operated may hide image I, and crane-side display terminal 58 and display terminal 59 which have not been operated may keep image I displayed.

Further, one of crane-side display terminal 58 and display terminal 59, when the operation of changing the scale of map information M or the zoom magnification of camera 51 is performed, transmit to control apparatus 20 that the operation of changing the scale of map information M or the zoom magnification of camera 51 is performed. Then, control apparatus 20 changes and displays the zoom magnification of camera 51 and the scale of map information M of crane-side display terminal 58 and display terminal 59 which have not been operated.

Figure 13A:
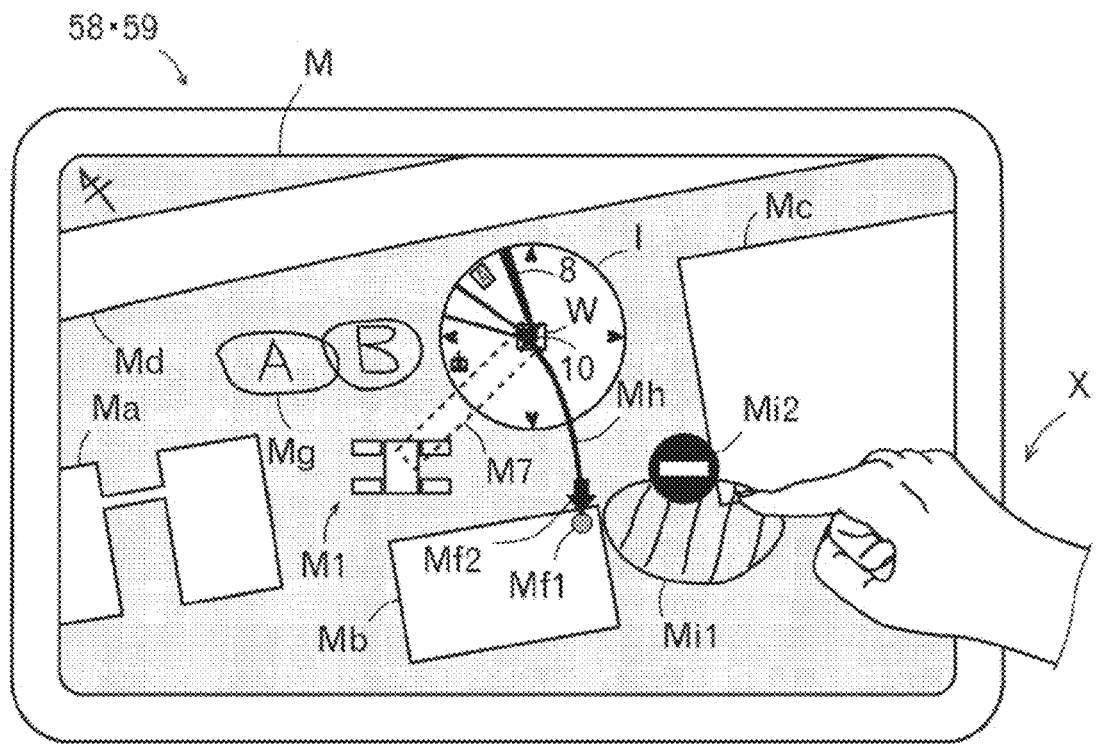
FIG. 13 illustrates the sharing of map information and images when simultaneous operations are performed on a plurality of crane-side display terminals and the display terminals.
Figure 13B:
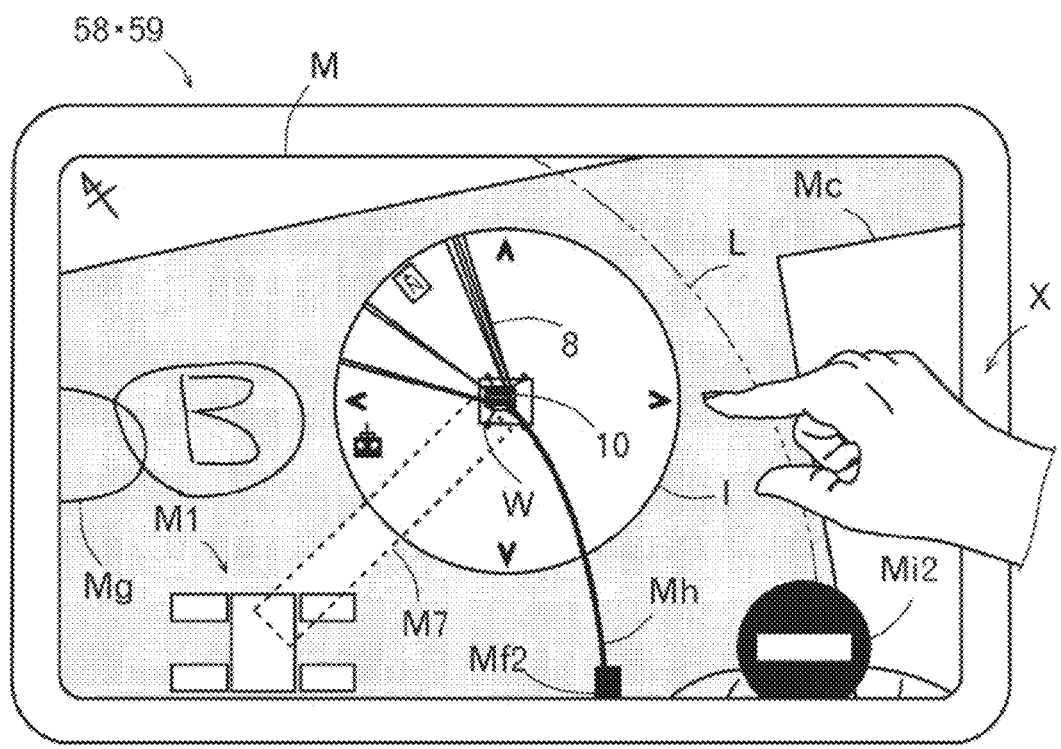

Next, with reference to FIG. 13A and FIG. 13B, the sharing of map information M and image I when the operation is simultaneously performed on a plurality of crane-side display terminal 58 and display terminal 59 will be described.

When the operation of inputting the information, hiding image I, and changing the scale of map information M or the zoom magnification of camera 51 is performed simultaneously in a plurality of crane-side display terminals 58 and display terminals 59, there is a possibility that confusion such as a change in the scale of map information M may occur during the input of the information. Therefore, map information M, image I, and the input information may not be simultaneously shared by a plurality of crane-side display terminals 58 and display terminals 59. For example, in one of crane-side display terminal 58 and display terminal 59, operator X inputs information (refer to FIG. 13A). At this time, when another operator X changes the scale of map information M in crane-side display terminal 58 or display terminal 59 to which the information is not input (see FIG. 13B), the scale of map information M crane-side display terminal 58 or display terminal 59 to which the information is input is not changed.

Figure 14A:
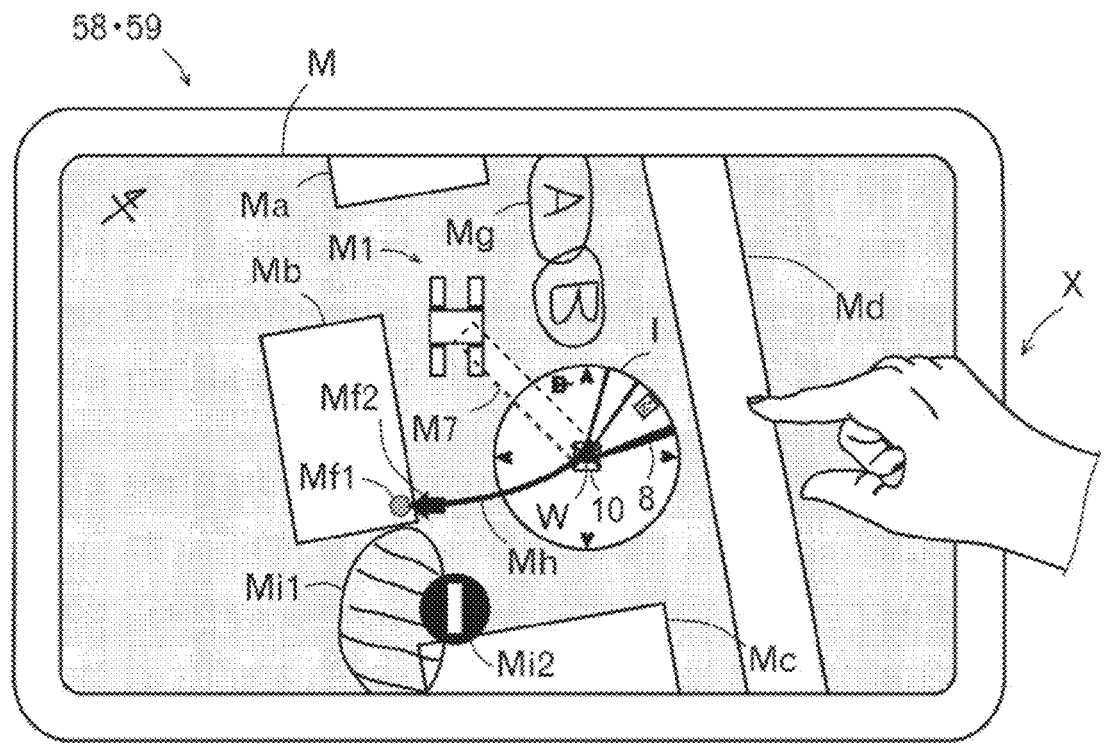
FIG. 14 illustrates rotation of map information and an image.
Figure 14B:
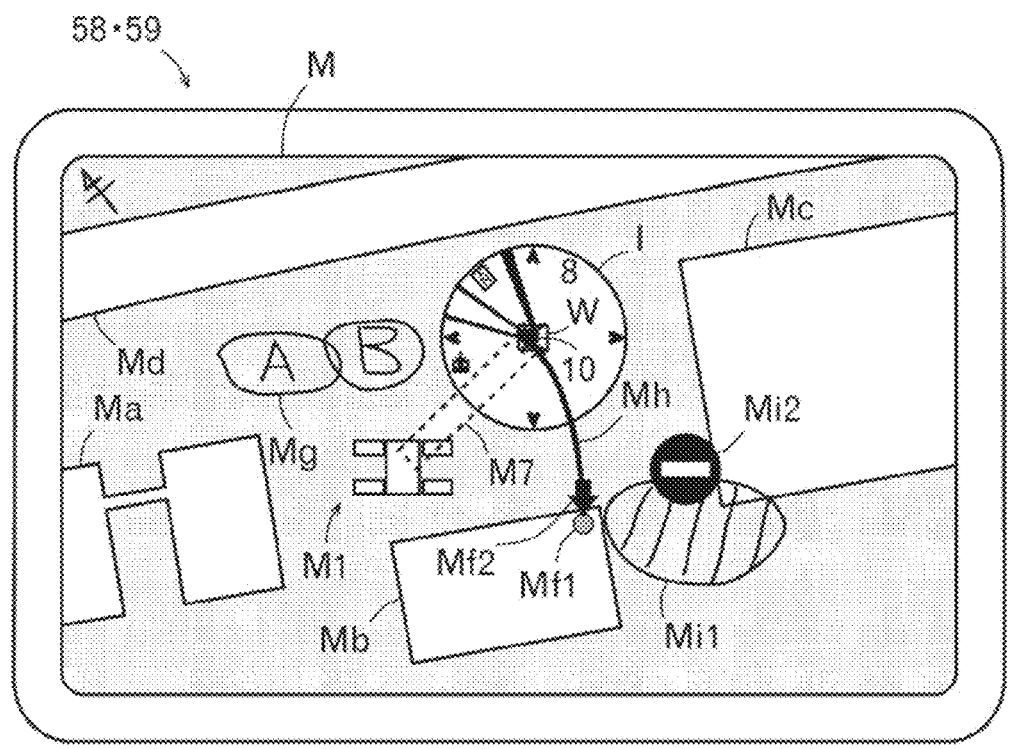

Next, with reference to FIG. 14A and FIG. 14B, the rotation of map information M and image I will be described.

Map information M and image I may be rotated as desired by operator X so as to be individually displayed on crane-side display terminal 58 or display terminal 59. For example, in one of crane-side display terminal 58 and display terminal 59, operator X performs the rotation of map information M and image I by moving the two fingers to twist while touching the touch panel (refer to FIG. 14A). At this time, in crane-side display terminal 58 and display terminal 59 which are not operated, map information M and image I are not rotated (refer to FIG. 14B).

As described above, crane 1 includes an information input section (crane-side display terminal 58 and display terminal 59) for inputting the information to be displayed on map information M and image I (installation position image Mf1, installation position image M12, slinging position image Mg, carriage route image Mh, approach prohibition instruction image Mi1, and approach prohibition instruction image Mi2). In the case where a plurality of displays (58 and 59) are provided, one display (58 and 59) displays map information M, image I, and the information (Mf1·Mt·Mg·Mh·Mi·Mi2) input by the information input section, and the other display (58 and 59) displays map information M, image I, and the information (Mf1·Mf2·Mg·Mh·Mi1·Mi2) in the same manner as the one display (58 and 59). According to such crane 1, each operator X inputs the information (Mf1·Mf2·Mg·Mh·Mi1·Mi2) and displays the input information (Mf1·Mf2·Mg·Mh·Mi1·Mi2) on displays (58, 59) carried by other operators X, thereby allowing each operator X to issue instructions at the discretion of each operator X and to communicate with each other.

Next, with reference to FIG. 15A, FIG. 15B, FIG. 15C, FIG. 16A, FIG. 16B, and FIG. 16C, a display mode of map information M and image I when load W is moved by automatic control will be described. When load W is moved by automatic control, operator X indicates the installation position of load W, whereby control apparatus 20 automatically generates the carriage route of load W. Crane 1 automatically moves load W along the generated carriage route of load W.

Figure 15A:
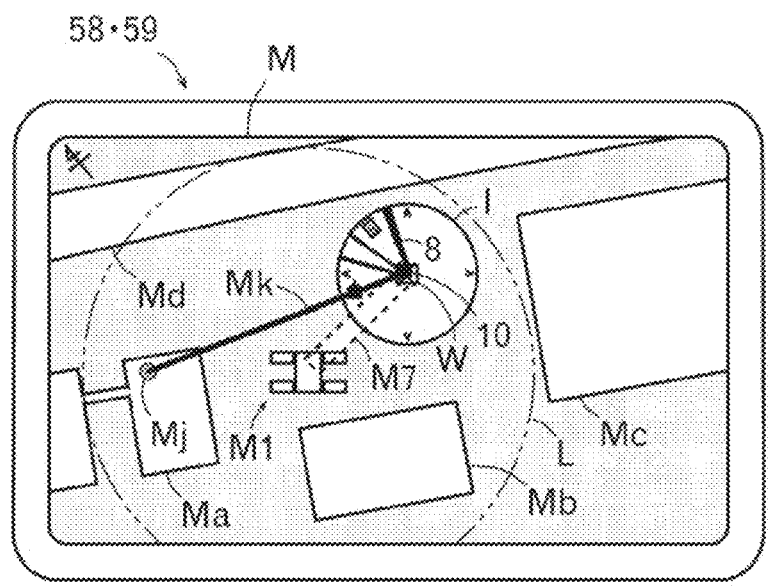
FIG. 15 illustrates a display mode of map information and an image when a load is traveled under automatic control.
Figure 15B:
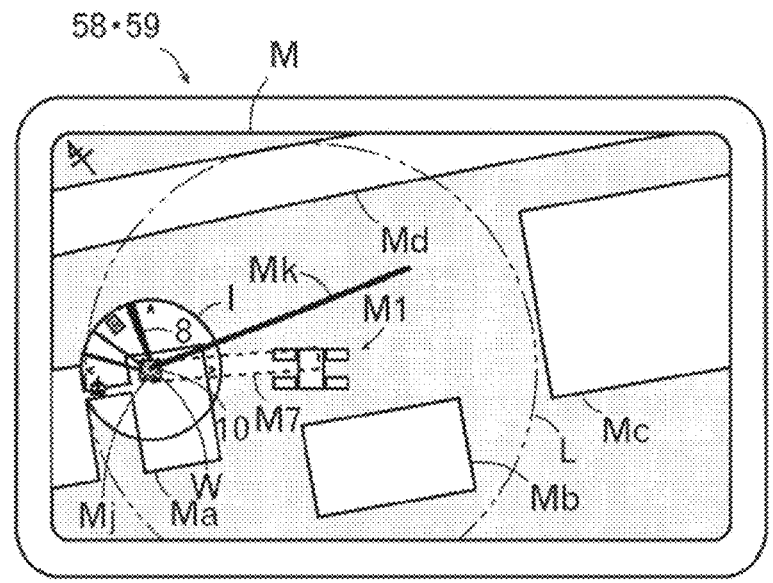
Figure 15C:
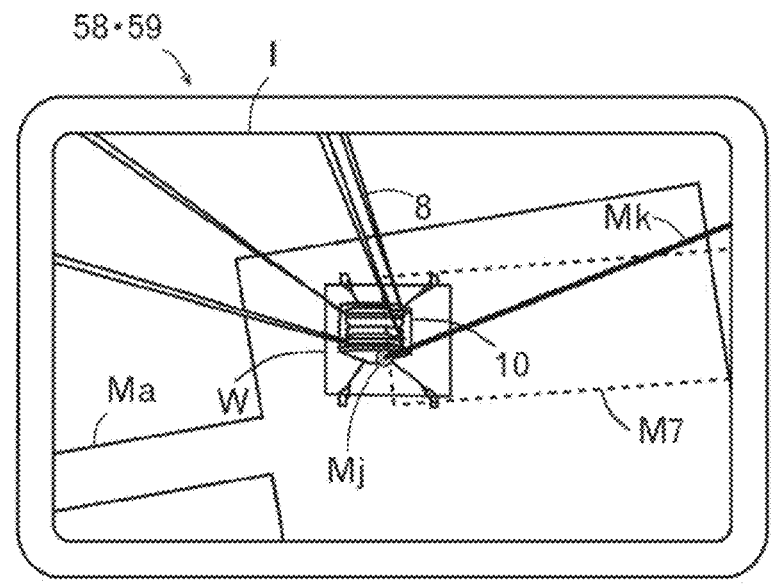

As shown in FIG. 15A, FIG. 15B and FIG. 15C, in one of crane-side display terminal 58 and display terminal 59, the installation position of load W is input by operator X, installation position image Mj of the mark indicating the installation position of load W is displayed (refer to FIG. 15A). Control apparatus 20 generates the carriage route of load W based on the current position and the installation position of load W, and displays carriage route image Mk. Therefore, control apparatus 20 can display the carriage route of load W so that operator X can confirm the carriage route on map information M. When load w is automatically moved along the generated carriage route, image I is displayed while moving to the position on map information M corresponding to the coordinates of camera 51 (refer to FIG. 15B). By this, control apparatus 20 can display the actual situation around load W being carried so that operator X can monitor and confirm the situation. In addition, control apparatus 20 can display the movement of load W so that operator X can easily recognize the movement intuitively. When starting to suspend load W or when load W falls within a predetermined range from the installation position, control apparatus 20 displays image I by increasing the distance ratio of image I with the digital zoom or the optical zoom of camera 51 (refer to FIG. 15C). By this, the control apparatus 20 can display such that operator X can easily monitor and confirm the surrounding situation of load W and the surrounding situation of the installation position, and adjust and designate the installation position and the like of load W.

Figure 16A:
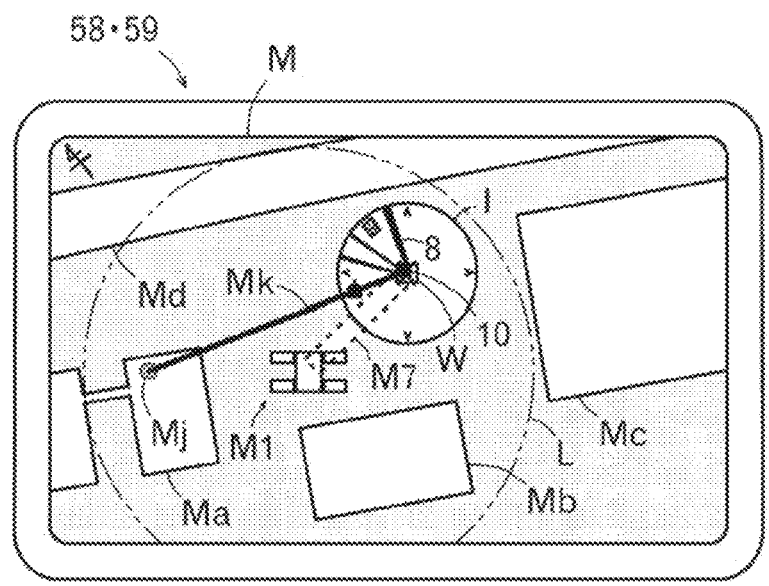
FIG. 16 illustrates a display mode of map information and an image when a load is traveled under automatic control.
Figure 16B:
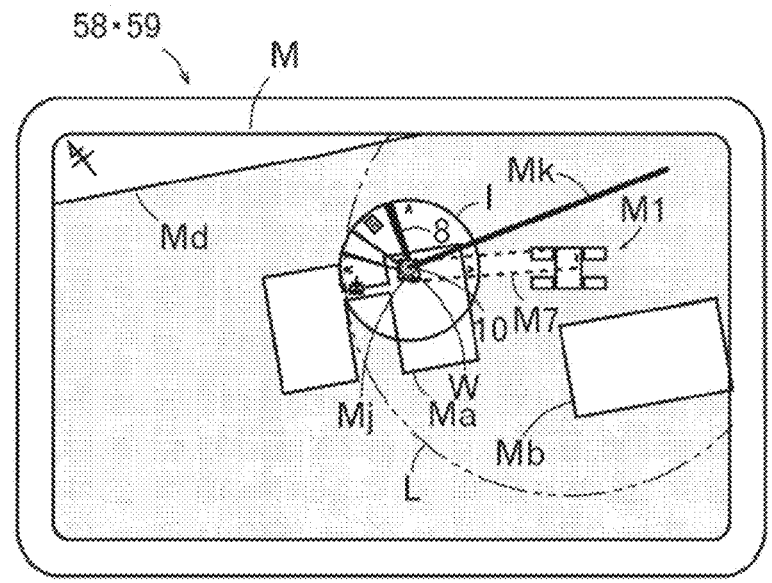
Figure 16C:
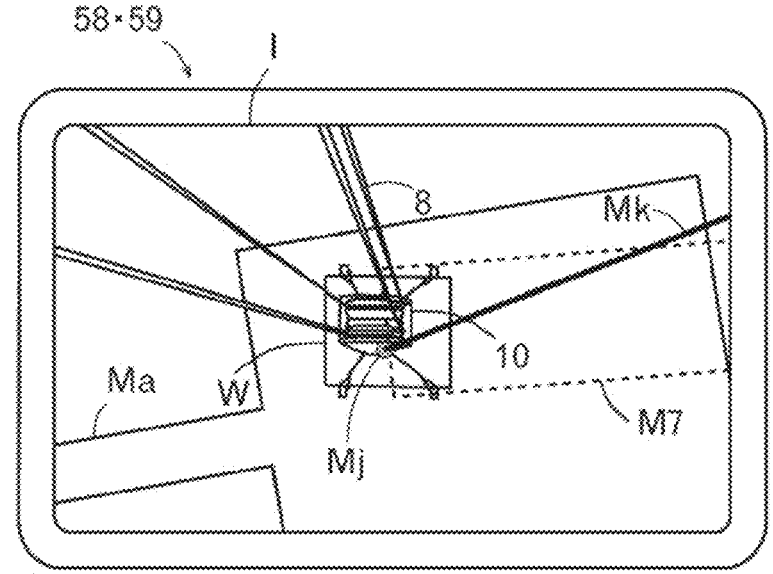

As shown in FIG. 16A, FIG. 16B and FIG. 16C, image I may be displayed by fixing the display position of image I on screen of the crane-side display terminal 58 or display terminal 59. More specifically, when load W is automatically carried along the generated carriage route, map information M is displayed such that the position of image matches the position of map information M in accordance with the coordinates of camera. 51 while the display position of image I on screen of the crane-side display terminal 58 or display terminal 59 is fixed (refer to FIG. 16B). At this time, map information M is scrolled and displayed on the screen of crane-side display terminal 58 or display terminal 59 in accordance with the coordinates of camera 51. As a result, control apparatus 20 can display load W so that operator X can constantly monitor and confirm a certain range from load W. Except for fixing the display position of image I on the screen of crane-side display terminal 58 or display terminal 59, the display mode is the same as that in the case of changing the display position of image I on the screen of crane-side display terminal 58 or display terminal 59 (refer to FIG. 16A and FIG. 16C). It should be noted that the display mode of map information M and image I when load W is moved has been described as automatically generating the carriage route of load W and automatically moving load W along the generated carriage route, but even when load W is moved by a manual operation, map information M and image I can be displayed in the same display mode.

Figure 17:
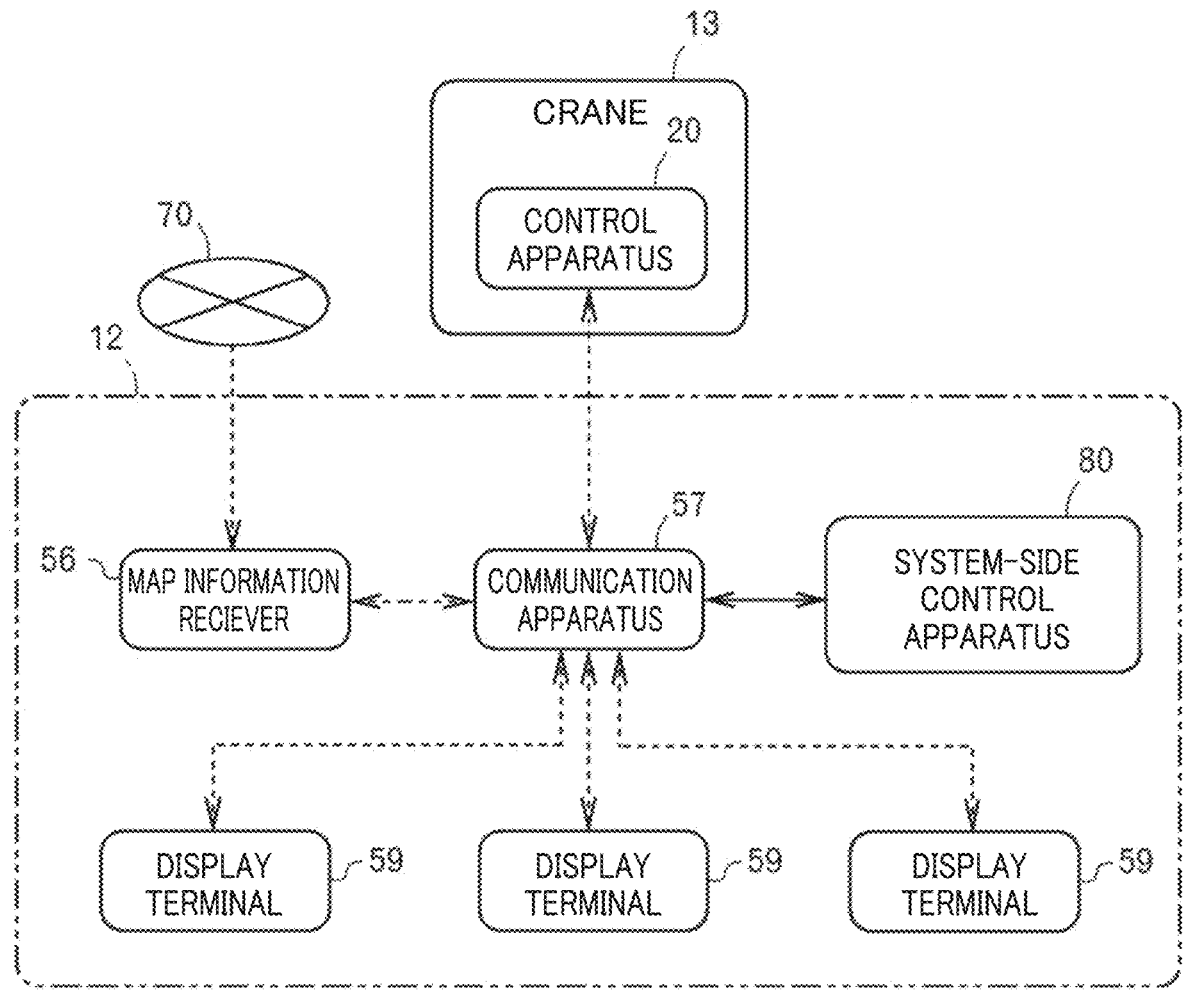
FIG. 17 illustrates an information-sharing system.

Next, information-sharing system 12 will be described with reference to FIG. 17. Here, crane 13 does not include map information receiver 56 and display terminal 59, and differs from crane 1 in that it does not display map information M, image I and the input information.

The working vehicle in information-sharing system 12 is crane 13, the working apparatus is crane device 3 (refer to FIG. 1). The working vehicle can also be applied to other working vehicles that take images from above by a camera attached to the working apparatus, in addition to crane 13. For example, the working vehicle can be applied to an aerial working vehicle.

System-side control apparatus 80 is a control apparatus of information-sharing system 12. System side controller 80 is attached to the distal end portion of boom 7. The system-side control apparatus 80 is connected to communication apparatus 57. Therefore, system-side control apparatus 80 can acquire, from controller 20 via communication apparatus 57, image I, the coordinates of camera 51, the operation signal of zoom manipulation tool 52, the orientation in which the vehicle 2 is facing, and the orientation on the image I.

System-side control apparatus 80 displays image I in an area on map information M having the same size as the imaging area of camera 51 in the plurality of display terminals 59 based on the information acquired from crane 13. Then, system-side control apparatus 80 uses the same display mode as the above-described embodiments when the scale of map information M is changed, when the zoom magnification of camera 51 is changed, when information is input, when the image I is hidden, and the like. Since display terminal 59 is a tablet terminal, it can be used by operator X by being disposed inside cabin 11.

As described above, information sharing system 12 is connected to the control apparatus of the working vehicle via communication apparatus 57 and acquires necessary information from the working vehicle, thereby easily configures a system for displaying the same display mode as the above-described embodiments.

As described above, information-sharing system 12 includes a control apparatus (system-side control apparatus 80), a plurality of displays (display terminal 59), and an information input section for inputting information (installation position image Mf1, installation position image Mf2, slinging position image Mg, carriage route image Mh, entry prohibition instruction image Mi1, and entry prohibition instruction image Mi2) to be displayed on display (59).

Then, control apparatus (80) displays image I taken by camera 51 in an area on map information M having the same size as the imaging area of camera 51 which is the coordinate position of camera 51 on map information M, in the case the scale of map information M or the distance ratio on image I with respect to the predetermined distance in the imaging area is changed in one display (59), displays the area of map information M and the imaging area of camera 51 in conjunction in all the displays (59), and displays the information (Mi1, Mf2, Mg, Mh, Mi1, Mi2) input into the one display (59) by the information input section in other display (or displays) (59) According to such information-sharing system 12, it is possible to display the information of the entire work range including the work range outside the imaging area of camera 51, and to share the information (Mf1, Mf2, Mg, Mh, Mi1, Mi2) input in the entire work range among the plurality of operators X.

However, the operation method described with reference to FIG. 4 to FIG. 16 is only an example of an applicable operation method, and other operation methods may be used to display any position of map information M and image I, to change the scale of map information M and the zoom magnification of camera 51, to input information to be displayed on map information M and image I, to hide image I, and to rotate map information M and image I.

Although the tablet terminal has been described as an example of display terminal 59 in the above embodiment, a so-called head mounted display or a display provided in a remote operation terminal of crane 1 can also be applied to the present invention in the same manner. When performing an operation on map information M and image I displayed on the head mount display, operator X can perform an operation on map information M and image I by a gesture operation for recognizing the content of the operation from the movement of operator X, a pointer operation for recognizing the position on map information M and image I from the direction of the head and the direction of the line of sight of operator X, or the like.

Finally, the technical idea disclosed in the present application can be applied to images obtained by combining three-dimensional data and construction drawings of a work site, BIM (Building Information Model) construction data, aerial images taken using a drone, images taken by camera 51 from various positions by swivel of boom 7, etc., in addition to map information M. Three-dimensional data is data of the three-dimensional shape of the work site detected by a laser scanner or the like. By cooperating with the BIM, various functions such as automatic notification of a construction procedure change can be provided.

INDUSTRIAL APPLICABILITY

The present invention relates to cranes and information-sharing systems. The present invention can particularly be used for a crane and an information-sharing system capable of displaying information of an entire work range including a work range outside an imaging area of a camera, and capable of sharing information input in the entire work range among a plurality of operators.

REFERENCE SIGNS LIST

1 Crane
2 Vehicle
3 Crane apparatus(work apparatus)
7 Boom
12 Information-sharing system 13 Crane (working vehicle)
20 Control apparatus
51 Camera
53 Sensor (GNSS receiver)
58 Crane-side display terminal (display)
59 Display terminal (display)
80 System-side control apparatus
I Image
M Map information
W Load

The invention claimed is:

1. A crane including a traveling body, a boom supported by the traveling body, and a camera supported by the boom, in which an image is taken by the camera, comprising:
   a control apparatus;
   a display; and
   a sensor for acquiring coordinates of the camera,
   wherein the control apparatus acquires map information in a work range of the crane, displays the map information on the display, and displays the image taken by the camera at a coordinate position of the camera on the map information, and
   wherein the control apparatus enlarges or reduces a size of the image such that the image is displayed in an area on the map information having the same size as an imaging area of the camera.

2. A crane including a traveling body, a boom supported by the traveling body, and a camera supported by the boom, in which an image is taken by the camera, comprising:
   a control apparatus;
   a display; and
   a sensor for acquiring coordinates of the camera,
   wherein the control apparatus acquires map information in a work range of the crane, displays the map information on the display, and displays the image taken by the camera at a coordinate position of the camera on the map information,
   wherein the control apparatus displays the image on an area on the map information having the same size as an imaging area of the camera,
   wherein when a scale of the map information is changed, the control apparatus changes a ratio of a distance on the image with respect to a predetermined distance in the imaging area at a change rate of the scale, and
   wherein when the ratio of the distance on the image with respect to the predetermined distance in the imaging area is changed, the control apparatus changes a scale of the map information at a change rate of the ratio.

3. A crane including a traveling body, a boom supported by the traveling body, and a camera supported by the boom, in which an image is taken by the camera, comprising:
   a control apparatus;
   a display; and
   a sensor for acquiring coordinates of the camera,
   wherein the control apparatus acquires map information in a work range of the crane, displays the map information on the display, and displays the image taken by the camera at a coordinate position of the camera on the map information,
   wherein the crane further comprises an information input section for inputting information to be displayed on the map information and the image, and
   wherein when a plurality of the displays are provided, one of the displays displays the map information, the image, and the information input by the information input section, and the other display displays the map information, the image, and the information in the same manner as the one display.

4. An information-sharing system acquiring an image taken by a camera from a working vehicle including a working apparatus, the camera supported by the working apparatus, and a sensor for acquiring coordinates of the camera, comprising:
   a control apparatus;
   a plurality of displays; and
   an information input section for inputting information to be displayed on the displays,
   wherein the control apparatus acquires a work range of the working vehicle from the working vehicle, acquires coordinates of the camera from the sensor, displays map information in the work range on all the displays, and displays the image taken by the camera on an area on the map information having the same size as an imaging area of the camera, the area being a coordinate position of the camera on the map information,
   wherein when a scale of the map information in one of the displays is changed, the control apparatus changes a scale of the map information displayed on the other display and a ratio of a distance on the image with respect to a predetermined distance in the imaging area on all the displays at a change rate of the scale,
   wherein when a ratio of a distance on the image with respect to a predetermined distance in the imaging area on one of the displays is changed, the control apparatus changes a scale of the map information displayed on all the displays and a ratio of a distance on the image with respect to a predetermined distance in the imaging area on the other display at a change rate of the scale,
   wherein the control apparatus displays information input into one of the displays by the information input section on the other display.

* * * * *